US011552317B2

(12) United States Patent
Allo

(10) Patent No.: US 11,552,317 B2
(45) Date of Patent: Jan. 10, 2023

(54) AUTONOMOUS POWER GENERATION SYSTEM

(71) Applicant: ElektrikGreen, Inc., Lyons, CO (US)

(72) Inventor: Christopher N. Allo, Lyons, CO (US)

(73) Assignee: ElektrikGreen, Inc., Lyons, CO (US)

( * ) Notice: Subject to any disclaimer, the term of this patent is extended or adjusted under 35 U.S.C. 154(b) by 0 days.

(21) Appl. No.: 16/948,950

(22) Filed: Oct. 7, 2020

(65) Prior Publication Data

US 2021/0104764 A1 Apr. 8, 2021

Related U.S. Application Data

(60) Provisional application No. 62/911,434, filed on Oct. 7, 2019.

(51) Int. Cl.
*H01M 8/04082* (2016.01)
*H01M 8/04828* (2016.01)
(Continued)

(52) U.S. Cl.
CPC ..... *H01M 8/0656* (2013.01); *H01M 8/04201* (2013.01); *H01M 8/04835* (2013.01);
(Continued)

(58) Field of Classification Search
CPC ........... H01M 8/0656; H01M 8/04201; H01M 8/04835; H01M 8/0687; H01M 8/04902; H01M 8/04932; H01M 2250/10
(Continued)

(56) References Cited

U.S. PATENT DOCUMENTS 7,279,245 B1 * 10/2007 Clark ................ H01M 8/04097
429/410
8,435,684 B2 5/2013 Kani et al.
(Continued)

FOREIGN PATENT DOCUMENTS

JP 4023731 B2 4/2004
JP 2006008459 A 1/2006
WO 2009063104 A1 5/2009

OTHER PUBLICATIONS

Pascuzzi, Simone, et al., "Electrolyzer Performance Analysis of an Integrated Hydrogen Power System for Greenhouse Heating. A Case Study". Sustainability Web. Jul. 5, 2016.

*Primary Examiner* — Christian Roldan
(74) *Attorney, Agent, or Firm* — Hall Estill Law Firm

(57) ABSTRACT

Method and apparatus for generating green electrical power. During a hydrogen gas storage mode, an electrolyzer generates a stream of hydrogen gas from water supplied by a water source and using power from an input power source. A hydrogen tank temporarily stores the stream of hydrogen. During a power generation mode, a fuel cell converts the stream of hydrogen gas from the tank into output electrical power by combining the hydrogen with oxygen. An inverter conditions and supplies the electrical power to a local load. A controller circuit uses a system parameter to adaptively switch between the storage mode and the power generation mode. In some cases, external power is supplied during the generation and storage of the hydrogen gas from an electrical grid or a local renewable source such as a set of solar panels. Respective grid-tied, solar-tied, grid-only, off-grid, and electric vehicle charging configurations are provided.

18 Claims, 13 Drawing Sheets

(51) Int. Cl.
  *H01M 8/04858* (2016.01)
  *H01M 8/18* (2006.01)
  *H01M 16/00* (2006.01)
  *H01M 8/0656* (2016.01)
  *H01M 8/0662* (2016.01)

(52) U.S. Cl.
  CPC ... *H01M 8/04902* (2013.01); *H01M 8/04932* (2013.01); *H01M 8/0687* (2013.01); *H01M 2250/10* (2013.01)

(58) Field of Classification Search
  USPC .......................................................... 429/422
  See application file for complete search history.

(56) References Cited

U.S. PATENT DOCUMENTS

| | | | |
|---|---|---|---|
| 8,685,223 B2 | 4/2014 | Kurashina et al. | |
| 9,489,701 B2 | 11/2016 | Emadi et al. | |
| 2002/0018922 A1* | 2/2002 | Fuglevand | H01M 8/04701 429/444 |
| 2004/0126641 A1* | 7/2004 | Pearson | H01M 8/04567 429/413 |
| 2005/0109394 A1 | 5/2005 | Anderson | |
| 2006/0068246 A1* | 3/2006 | Matsuo | H01M 8/0612 429/410 |
| 2007/0082239 A1* | 4/2007 | Shiroma | C25B 1/04 429/418 |
| 2009/0189445 A1* | 7/2009 | Strizki | H02J 7/34 307/21 |
| 2014/0034187 A1 | 2/2014 | Farchmin et al. | |

* cited by examiner

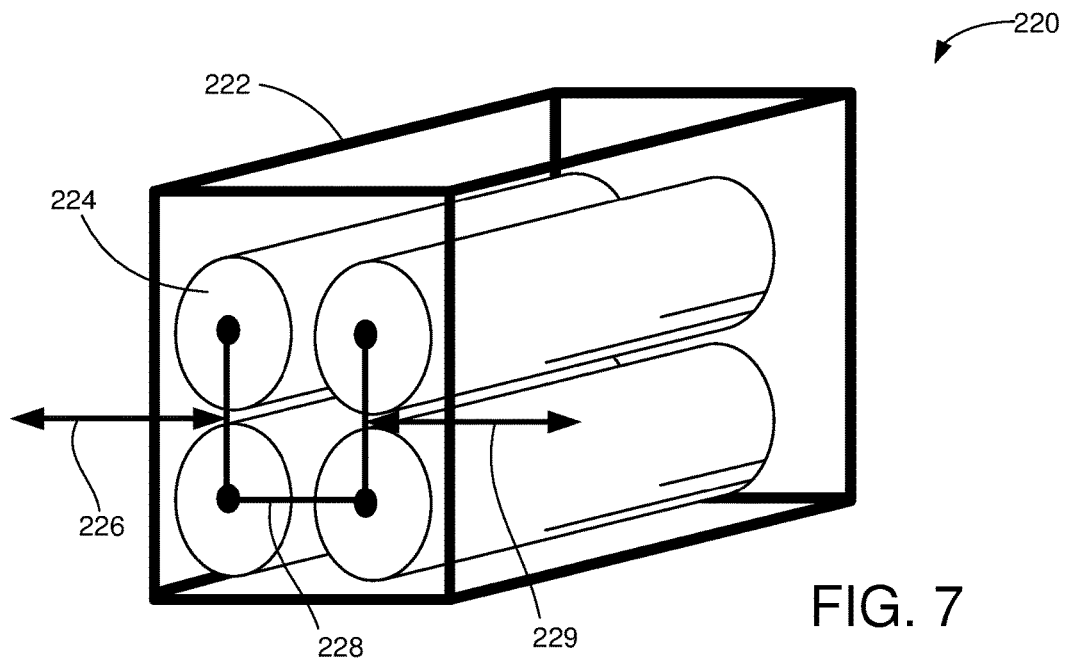
FIG. 7
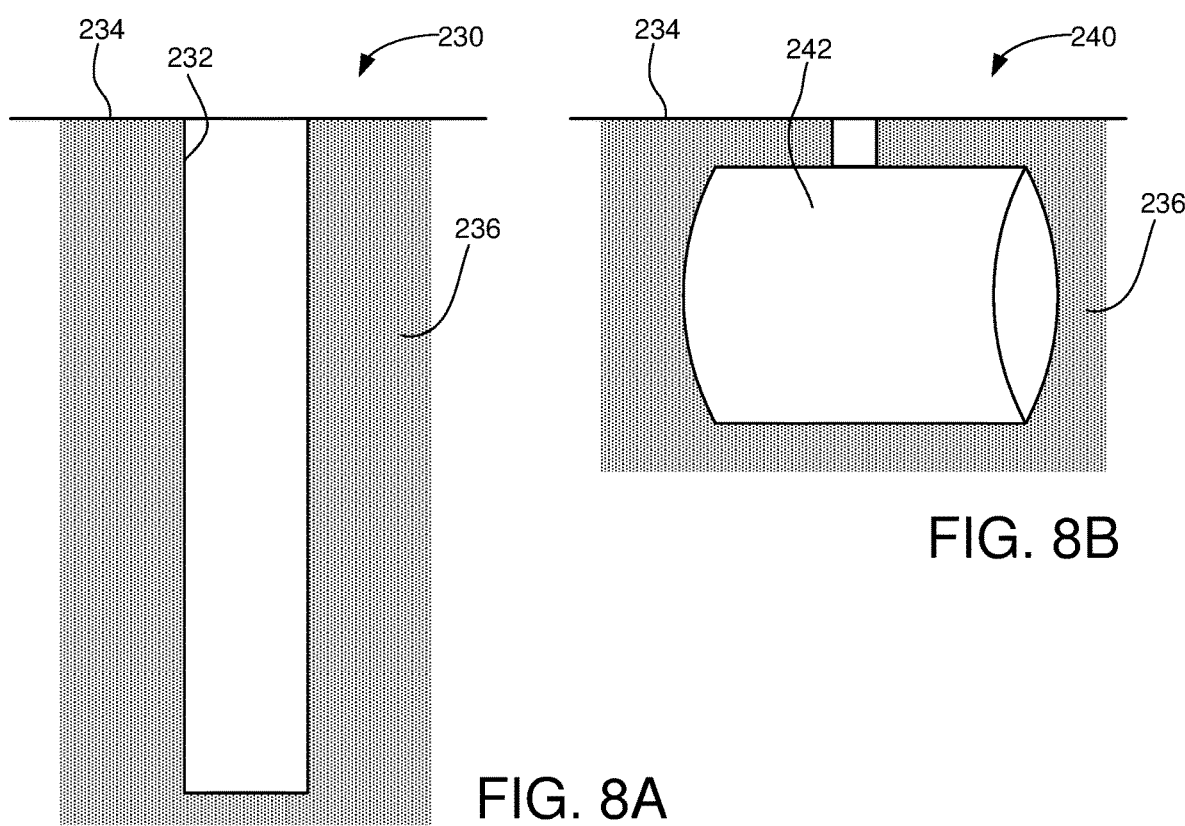
FIG. 8A
FIG. 8B

AUTONOMOUS POWER GENERATION SYSTEM

RELATED APPLICATIONS

The present application makes a claim of domestic priority to U.S. Provisional Patent Application No. 62/911,434 filed Oct. 7, 2019, the contents of which are hereby incorporated by reference.

BACKGROUND

Sustainable energy (also sometimes referred to as renewable energy or green energy) generally refers to efforts to generate and utilize energy in an efficient manner such that present needs can be met without adversely affecting future generations. A variety of sustainable energy solutions have been proposed and implemented, such as through the harnessing of solar, wind, geothermal, tidal and other forms of available energy. In one definition, "green energy" can be viewed as energy that is produced cleanly with no carbon footprint during operation. The term "grey energy" is sometimes applied to solutions that utilize some amount of input energy from a non-green source, but is otherwise "green" in subsequent processes or in at least some modes of operation.

While a number of green energy solutions have been proposed, these and other solutions have not been widely adopted from a generation or storage perspective. One limitation is the inability to effectively store energy that is produced at one time (such as during a sunny or windy day) for use during another time (such as at night, during a cloudy or windless day, etc.).

Batteries have been proposed as a mechanism to chemically store energy for future use. However, large capacity batteries are expensive to manufacture, often utilize rare earth and toxic materials that make recycling/disposal environmentally undesirable, and as (as of now) do not provide an acceptable operational life. For example, some forms of modern high capacity batteries can lose as much as 70% of their charge carrying capability in just 2-3 years, and may not last much longer than 8-10 years even with degraded levels of performance. Batteries are also subject to other dangers as well, such as fire, the generation of noxious fumes, etc.

Other forms of energy storage have been proposed and utilized in the art, and these have likewise been met with various limitations. Examples include compressed air (e.g., store energy in the form of compressed air that is then released to spin a turbine), water movement (e.g. pump water to a higher elevation and then release the water to allow gravity to move the water against a turbine), etc.

Accordingly, various embodiments of the present disclosure are generally directed to improvements in the self-generation and storage of electrical power that overcome these and other limitations of the existing art.

SUMMARY

Various embodiments of the present disclosure are generally directed to an apparatus and method for the generation, storage and use of energy in an efficient and environmentally responsible manner.

In some embodiments, an electrolyzer generates a stream of hydrogen gas from water supplied by a water source and using power from an input power source. A hydrogen tank temporarily stores the stream of hydrogen. A fuel cell subsequently converts the stream of hydrogen gas from the tank into output electrical power by combining the hydrogen with oxygen. An inverter conditions and supplies the electrical power to a local load. A controller circuit adaptively changes the rate at which the output electrical power is generated by the fuel cell responsive to at least one system parameter. In some cases, external power is supplied during the generation and storage of the hydrogen gas from an electrical grid or a local renewable source such as a set of solar panels. Respective grid-tied, solar-tied, grid-only and off-grid configurations can be used.

These and other features and advantages of various embodiments can be understood from a review of the following detailed description in conjunction with a review of the accompanying drawings.

BRIEF DESCRIPTION OF THE DRAWINGS

FIG. 7 depicts a remote hydrogen gas storage system 220 in some embodiments.

FIGS. 8A and 8B depict alternative remote hydrogen gas storage systems 220 that can be incorporated in other embodiments.

DETAILED DESCRIPTION

Figure 1:
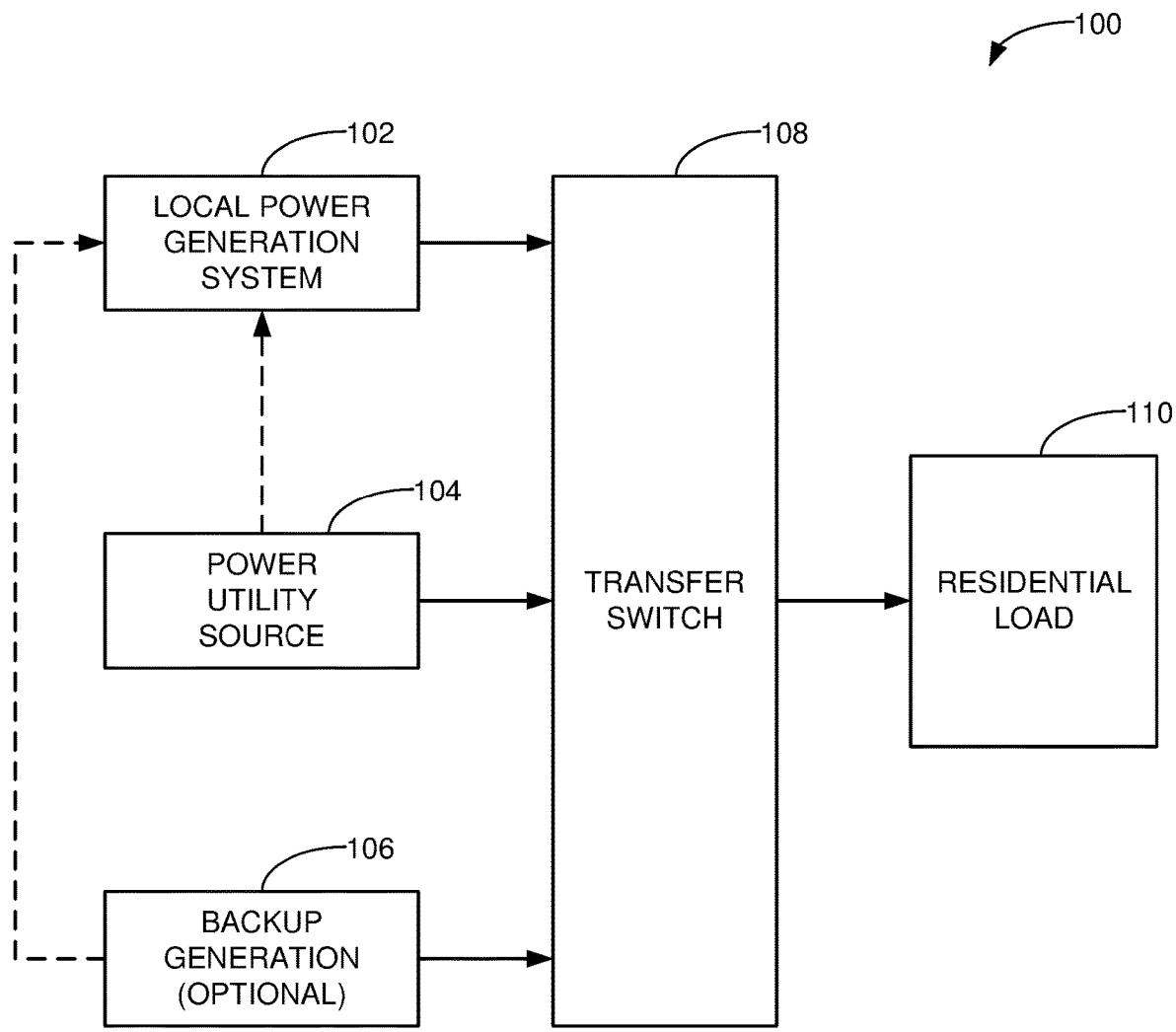
FIG. 1 provides a functional block representation of an electrical power generation system constructed and operated in accordance with various embodiments of the present disclosure.

The present disclosure generally relates to systems and methods for generating, storing and using electrical power in a sustainable manner that conforms with green energy standards and capabilities.

As explained below, a local power generation system and method of operation of the same is provided. While not limiting, the system is intended to provide a user with sufficient electrical power to meet current and future needs in a sustainable fashion without direct reliance upon a public utility or other external source of power (e.g., an "off-grid" approach). The system is modular, scalable, and does not necessarily rely upon batteries or other existing technologies that can have an adverse impact upon the environment.

A variety of sustainability levels are provided. In some cases, the system is capable of providing electrical energy in a completely self-sustaining mode, so that no interconnection with an existing electrical grid is necessary. The energy is fully green, in that no carbon emissions are generated or used, while supplying energy at a level commiserate with a typical household, small commercial enterprise, etc.

A number of other configurations are also contemplated. Off-grid and/or on-grid configurations can be used that utilize one or more backup power generation sources, such as propane, natural gas, batteries, generators, or other sources of power.

Still other embodiments utilize the system in a co-generation scheme whereby most of the electrical power utilized by the local user is locally generated by the system, but a system tie-in exists so that, in some cases, excess power generated by the system can be made available for use by the interconnected power system, and as required, power can be drawn by the interconnected power system to initiate or support the local generation, storage and use of energy. Grid-tied systems can be configured to supply excess electricity back to an existing grid.

Yet other embodiments can be configured as a source of generating hydrogen, which may or may not be used to generate local power. An example includes a hydrogen filling system that provides compressed hydrogen gas for suitable uses, such as for filling a fuel tank for a hydrogen fueled car, an on-demand gas supply system, etc.

Some embodiments include an input power source of electricity. The input electricity can be in the form of direct current (DC) electricity, such as from a source of solar power, wind power, etc. The input power can also be in the form of alternating current (AC) power, such as from a source of solar power, wind power, grid power, a local generator, etc. Regardless, it is contemplated in some embodiments that the input power source will take the form of solar (photovoltaic) cells, although other forms can be used including renewable energy sources such as wind turbines, geothermal generation systems, etc. In other cases, either temporarily or permanently, the input power source can be from a public utility-grid, a local generator, a battery that has stored electrical energy, etc.

The input power is supplied to an electrolyzer, also sometimes referred to as a hydrolyzer, which operates upon a supply of water ($H_2O$) from a water source to generate a stream of hydrogen ($H_2$) gas. Different forms of electrolyzers may be used as known in the art, including PEM (proton exchange membrane) and AEM (anionic exchange membrane) units. It will be noted that no particular type of electrolyzer is required, so that the system can support each of the above methods as well as any other existing or future developed methods. In some embodiments, the output stream of $H_2$ gas is subjected to a conditioning stage, such as via a dryer, to remove undesired components (e.g., water component, etc.) and purify the stream.

The output stream of conditioned (dried) hydrogen is directed, via a conduit network, for storage in a pressurized tank. While it is contemplated that the electrolyzer will generate sufficient pressure to charge the tank, further elements can be implemented or controlled as desired, such as a compressor or booster, to achieve the desired pressure. The input power is thus transformed and stored, via the electrolyzer and the tank, as pressurized hydrogen gas. While pressurized hydrogen gas is contemplated, this is not limiting; other embodiments can store the hydrogen in the form of liquified hydrogen, provided adequate control systems are in place to manage the necessary state transformation processes.

At such time that it is desired to generate electricity for local use, the previously stored hydrogen is directed in a gaseous state to a hydrogen fuel cell. The fuel cell takes the dry hydrogen and combines this with available oxygen in the surrounding atmosphere to generate (typically) direct current (DC) power. Residual condensate water is directed back to the water source. The output DC power from the fuel cell may be applied to a DC/AC inverter, which outputs alternating current (AC) power at desired frequency and phase (e.g., 60 Hz, 50 Hz, etc.) in accordance with United States, European, Asian, or other regional power formats.

The output AC power is thereafter used to drive local loads, such as the residential loading of a residential structure, the commercial loading of a commercial entity, etc. A transfer switch can be used to control the flow of power to the local residential or commercial loading in cases where such loads are also capable of being serviced by a local power grid. The transfer switch can be a separate unit, or incorporated as a part of the DC-AC inverter of the system as required.

The system can incorporate a contained knowledge base that adjusts, over time, the operation of the system to match the needs of a particular deployment. To this end, the system can further comprise various electrical and mechanical control elements including sensors to monitor the operation of the system, and a controller which provides top level control of the system. The controller performs various functions including monitoring load needs over time, adjusting the rate of operation of the various elements to meet both the current and anticipated future needs of the system, and, as required, switching in or out the application of other sources of electrical power, including an available public utility grid, a local generator, etc.

The system is thus an autonomous system that can be plugged in and operated immediately upon installation. The system monitors the various components and may communicate with a cloud-based knowledge base to adjust and optimize the system operation. A local knowledge base can be maintained to provide suitable adjustments without the need to access the cloud. There is no need for human involvement in the system, such as by refilling tanks, transportation of tanks, etc. as with existing designs, although such can be incorporated as required. Moreover, there is no express need for backup mechanical systems to provide layers of energy production and supply, although such systems can be incorporated as desired.

In this way, a true green energy, self-sustaining source of power can be provided, allowing primary, backup auxiliary power or a complete off-grid configuration. The system provides sustainable energy in an efficient and cost effective manner. However, as desired any number of different system configurations can be provided, including a system that operates in a "mostly off-grid" fashion, a system that provides emergency backup power in the event of a power grid outage, a system that generates hydrogen gas for the use of an electric, hydrogen powered vehicle or other system such as an on-demand hydrogen source, etc.

These and other features and advantages of various embodiments can be understood beginning with a review of FIG. 1 which shows a power system 100 in some embodiments. It is contemplated that the system 100 is adapted to supply electrical power to a local residential structure. Other operational environments are envisioned so the example of FIG. 1 is merely exemplary and is not limiting. For example, the system can instead be readily configured to supply electrical power for a commercial entity, to generate compressed hydrogen (in the form of hydrogen gas or liquid hydrogen) for other purposes, etc.

The example system in FIG. 1 includes a local power generation system 102, a power utility source (grid) 104 and, as desired, an optional secondary backup generation system 106.

The local power generation system 102 is the primary focus of the present disclosure and will be discussed in greater detail below. It will be understood that the system can operate with just the local system 102, although other embodiments can have a power grid connection and/or an emergency backup generator as shown. Accordingly, since FIG. 1 shows a number of different alternatives, not all of the elements shown in the drawing need be present.

In this particular case, the residential structure remains connected to the local utility grid (source 104) but does not rely on the grid for day-to-day operations other than those described herein. The backup generation source 106 may be an internal combustion engine that runs on a suitable fuel (e.g., natural gas, propane, etc.) and may serve as an optional source of auxiliary power. Neither the utility source 104 or backup generator 106 are necessarily required, but such are provided to illustrate one form of available configuration. Other forms of backup generation power can be used, such as one or more batteries, etc.

A power transfer switch 108 interconnects the various sources 102, 104 and 106. The switch 108 can be separate unit or integrated into system 102 as desired. Block 110 represents a residential load. This constitutes all of the electrical devices that are operated by the electrical power generated by the system. This can vary widely both in overall demand (e.g., kilowatts, KW) as well as the types and time-cycles of the loads. Without limitation, components of the load can include HVAC systems, swimming pool pumps, electric car charging stations, appliances, lights, electronics, etc. It is contemplated that the peak demand by the residential load 110 will vary widely throughout each 24 hour period, as well as vary over different times of the year (e.g., greater HVAC demand during summer as compared to spring, etc.).

The system 102 is modular so that a single unit can be used, or multiple units can be incorporated and operated in unison to support higher power consumption levels. Upgrades can be incorporated into the system 102 as well (such as additional electrolyzers, fuel cells, etc.) to further enhance modularity to meet different operational environments.

Figure 2:
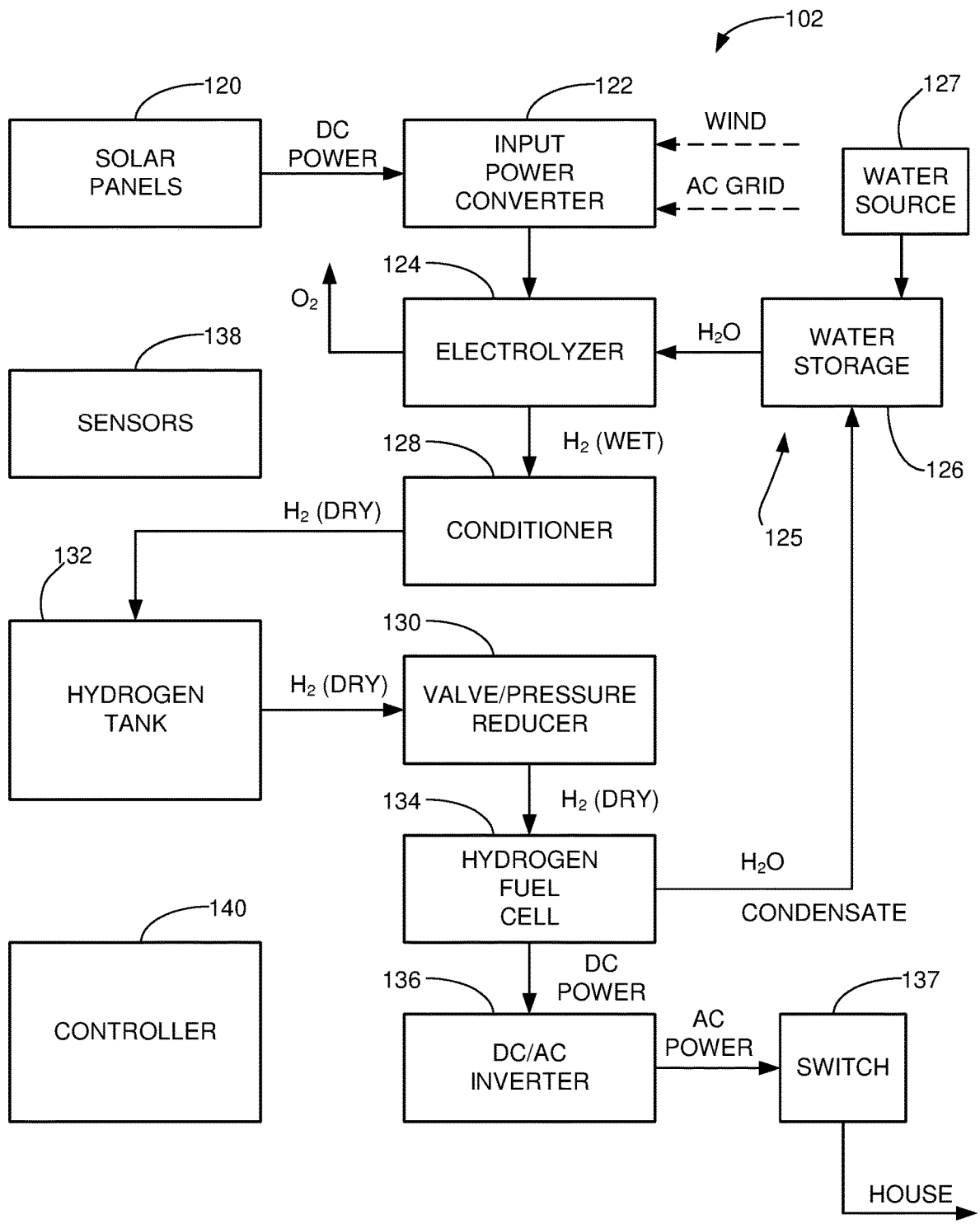
FIG. 2 is a generic functional block diagram of a local power generation system of FIG. 1 in accordance with some embodiments.

FIG. 2 shows a generic, simplified functional block representation of the local power system 102 of FIG. 1 in accordance with some embodiments. As before, the arrangement in FIG. 2 is merely for purposes of illustration and is not limiting, so that any number of other configurations can be used. A source of input power is supplied by a bank of solar (photovoltaic) panels 120. While solar panels are contemplated as being a particularly suitable form of input power, other forms can be used including other renewable energy sources such as wind power, hydroelectric power, etc. In some cases, the input power can be supplied directly from the AC power grid, from a backup generator, etc. (see FIG. 1).

The input power is provided at a suitable voltage level as a power input to an input power converter circuit 122. The circuit 122 converts the power and directs it to various elements in the system, including to an electrolyzer (hydrolyzer) 124. As noted above, the input power can be in the form of DC power, AC power, etc.

The electrolyzer 124 uses a separation process upon a stream of water ($H_2O$) from a water system 125. In at least some cases, the electrolyzer may be classified (per United States regulations) as a water gas generator (e.g., "8405.10.00.00 Water Process Gas Generator."). The water system 125 can take a variety of forms, and may include a water storage tank 126, a water source 127 with a reverse osmosis (RO) unit, etc. The electrolyzer 124 separates the input water into a stream (flow, etc.) of hydrogen ($H_2$) and a stream of oxygen ($O_2$).

The oxygen is vented to the surrounding atmosphere (or collected and stored for future use or other applications), and the hydrogen is directed to a conditioner 128. The conditioner 128 takes the "wet" hydrogen, which may have an unacceptably high level of saturated water content, to form "dry" hydrogen gas, which will have a sufficiently low level of water content and other constituent elements. As a result, the conditioner may also sometimes be referred to as a "dryer," although any number of conditioning configurations can be used.

The stream of dry hydrogen gas is directed to a hydrogen tank 132. While the tank is shown in FIG. 2 to be incorporated into the rack, as explained below other storage configurations are contemplated, such as location of the tank(s) in a remote location, such as outside a residential or commercial structure in which the other constituent elements depicted in FIG. 2 are located. In some cases, the tank(s) may be situated in a rack, may be buried underground, etc.

The tank 132 is a standard hydrogen-compatible, pressurized tank and is easily sized to provide sufficient energy storage capacity for the needs of the system. Depending on the hydrogen generating capabilities and the residential load requirements of the system, none, some, most or all of the hydrogen generated during the operation of the solar panels 120 and the electrolyzer 124 will be directed to the tank. While not limiting, it is contemplated that the electrolyzer will run and store the hydrogen gas at a separate time than when electricity is generated for local use.

The system is typically configured to generate excess hydrogen that can be stored in advance for future use. This is particularly useful for accounting for operation at night, during cloudy days, during periods of power outages, periods of snowfall that obfuscate the solar cells, windless days, etc. As long as the input power is available, the system can continue to generate and store compressed hydrogen for future use. The only practical limits upon the amount of hydrogen that can be stored are the availability of the energy source required to generate and store the hydrogen, and the storage capacity of the existing tank(s). Accordingly, by upgrading either or both of these constraints, nominally any practical amount of reserve hydrogen can be collected and ready for use. As noted above, racks of tanks, underground buried reservoirs, etc. can be expanded as required to provide the desired level of reserve power available to the system. In some cases, anticipated future needs can be augmented by the delivery and installation of additional pre-filled tanks of pressurized hydrogen (including rental tanks provided by a local commercial hydrogen gas source, etc.).

A hydrogen fuel cell 134 operates to take the hydrogen (either in-stream or from the tank) and essentially perform the reverse operation of the electrolyzer. That is, the fuel cell operates to take oxygen from the surrounding atmosphere and reactively combines this with the hydrogen to generate electrical power and water (condensate). The condensate may be directed back to the water source for reuse.

The output power from the fuel cell 134 may be in the form of DC power at a suitable voltage and current level. The DC power is directed to a DC/AC inverter 136 which outputs corresponding AC (alternating current) power for local use by the residential/commercial load 110 (FIG. 1) through an AC disconnect switch 137. As noted above, the output AC power can be in a suitable US/European/Asian format, as well as in any other desired format. It will be noted that while it is contemplated that the fuel cell outputs power in the form of DC, this is merely illustrative and not limiting, as based on configuration the fuel cell can output power in any suitable form, including AC power.

A plurality of sensors are represented at 138. The sensors are configured to sense various states of the system, including but not limited to operation of the solar panels, the electrolyzer, the tank, and the fuel cell. A number of system parameters are measured and monitored for use by a controller 140. Without limitation, these can include sensing AC presence, electrical usage levels, gas leaks, power consumption rates, water quality, filter state, and so on.

The controller 140 represents a set of control electronics that provide top level control of the system. The controller can take a variety of forms. It is contemplated albeit not necessarily required that the controller will include one or more programmable processors and associated programming (e.g., firmware, FW) that is stored in a local memory for execution. Any number of controller types can be used depending on the requirements of a given application.

Figure 3:
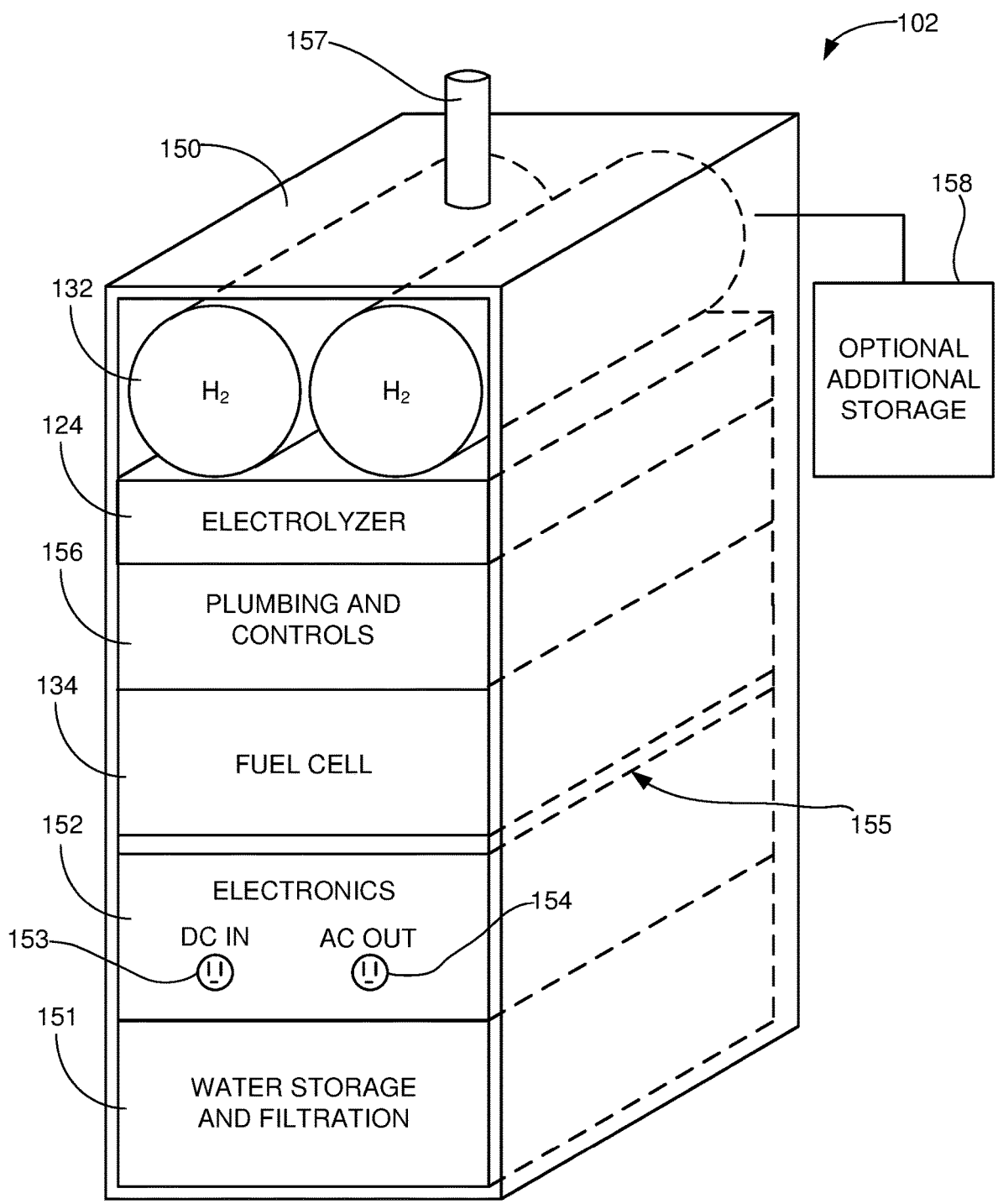
FIG. 3 is a schematic representation of the local power generation system of FIG. 2 arranged in a cabinet in accordance with some embodiments.

FIG. 3 is a schematic depiction of the local power system 102 of FIG. 2 in some embodiments. As before, this is merely illustrative and is not limiting. A "rack" or "cabinet" approach is envisioned. Other arrangements can be used. The system can be stored in a suitable location such as within a residential closet, garage, or even outdoors based on climate and upon the cabinet design. The system is modular so that additional elements can be added to expand the capabilities of the system. Multiple cabinets can be installed and hooked together as required to further expand the system capabilities. The use of multiple cabinets can allow higher voltage levels, including the generation of true three-phase AC power. The use of multiple electrolyzers in a single cabinet, or among multiple cabinets, can further increase the rate at which hydrogen gas is produced and stored. At this point, it will be noted that while currently discussed embodiments are directed to residential/commercial entities, other applications can readily be implemented, including on a boat, a micro-grid, etc.

The system 102 includes a cabinet (rack) 150 in which the various components from FIG. 2 can be conveniently located. While not limiting, the overall dimensions of the cabinet may be similar to those of a standard 42U-48U server cabinet of the types used in data centers. Other form factors may be used, so this is merely for purposes of illustration. One embodiment contemplates an overall rack size of approximately 22 inches (in.) wide by 76 in. high by 41 in. deep. These dimensions are typical and are not limiting. It will be noted that, regardless of configuration, the design is "small" compared to typical generation equipment.

The cabinet 150 includes various elements including a water filtration system 151 at the base of the system. This includes the various elements from FIG. 2 such as the water source, the RO unit, the tank(s), etc. While not separately denoted in the figure, sensors can be supplied to measure various parameters such as a TDS (total dissolved solids) level of both the input and output water. Solenoids can be supplied to regulate the water flow, etc. The water can be supplied from a separate source, or can be provided via a tank, etc.

An electronics module 152 can incorporate the various electronics of the system such as the input power converter 122, the inverter 136, the controller 140, etc. It will be noted that, generally, the system 102 may have two (2) input connections (solar, grid) and one (1) output connection (load); as shown, an input power terminal 153 admits input power from the solar panels (or other input power source), and an output power terminal 154 outputs the generated electrical power. The power connections will depend upon the configuration of the system; a totally off-grid system will receive the power from the solar panels, batteries, wind generation, tidal system, generator, etc. A tied-in system may alternately receive the power from such systems or a grid, etc. These and other considerations will readily occur to the skilled artisan, and further example configurations in accordance with these and other alternatives are discussed below.

An optional separation layer 155 (when used) can be disposed between the electronics module and remaining portions of the system that process the various gasses (hydrogen, oxygen, air, etc.), such as the hydrolyzer 124, the tanks 132, the fuel cell 134, etc. A plumbing and controls module 156 directs the inputs and outputs for these elements. This module may include various pressure regulation, flow control, safety modules, etc.

It will be noted that FIG. 3 shows the use of two of the hydrogen tanks 132 mounted at the topmost portion of the cabinet 150. While this location for the tanks can be used, it has been found advantageous to instead locate the tanks elsewhere, including outside the structure in which the rest of the elements in FIG. 3 are located, as discussed below. It will be noted that hydrogen is lighter than air and is relatively flammable, so it is prudent to place the electronics at the bottom and the hydrogen at the top (or outside). An optional vent 157 with a fan (not separately shown) can be used to vent any excess hydrogen to a safe location. While the cabinet is shown to be substantially "full" for purposes of pictoral demonstration purposes, it will be appreciated that additional space can be provided to accommodate additional elements to increase the power storage and generation capabilities of the system (e.g., another electrolyzer, another fuel cell, etc.). Additional hydrogen storage 158 can further be incorporated into the system, such as through the use of additional tanks, etc.

Figure 4:
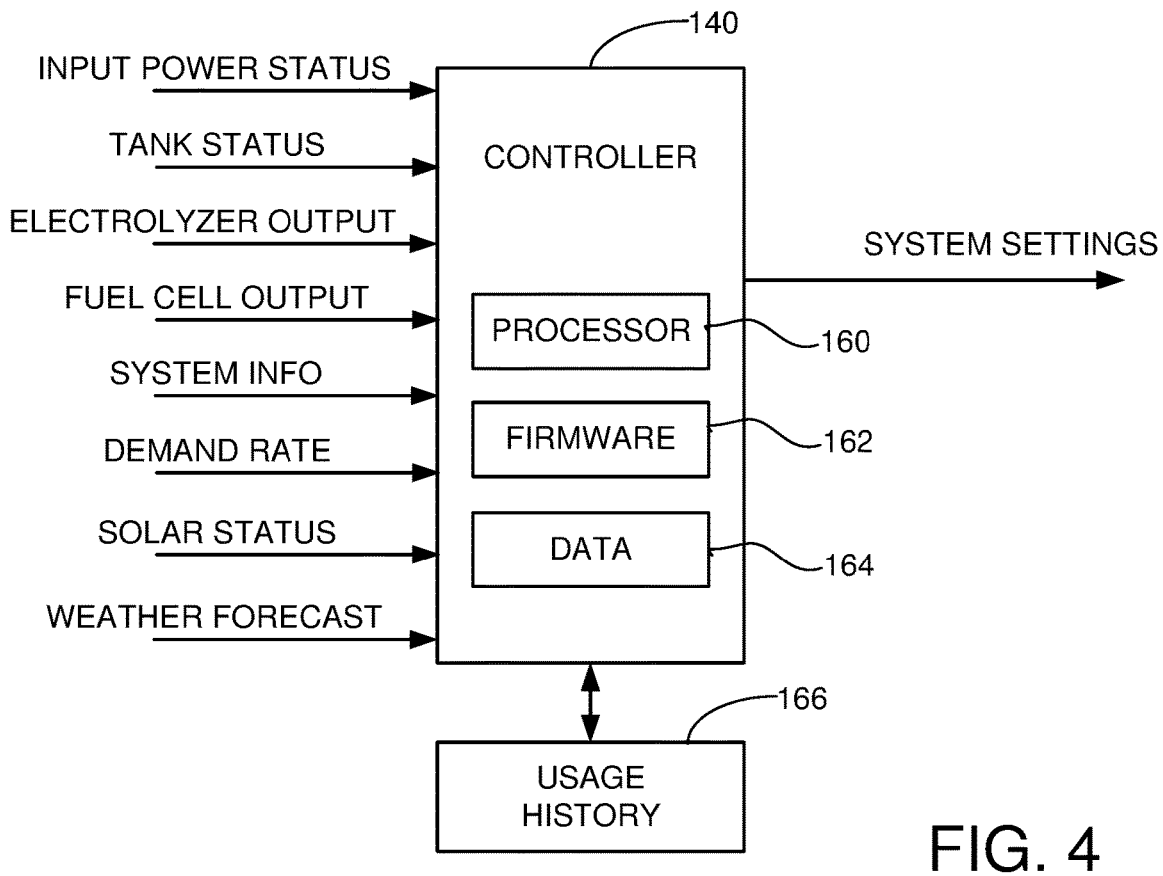
FIG. 4 shows operation of a controller of the system of FIGS. 2-3 in some embodiments.

FIG. 4 shows a functional block representation of the controller 140 in further embodiments. The controller includes a programmable processor 160, firmware 162 and data 164 used by the processor during operation. Block 166 represents additional storage (such as in the form of a local storage device) that accumulates, as a history log, usage history data from the system. The controller operates to collect and apply analytics associated with the operation of the system. As explained below, the analytics and other information can be stored locally as well as remotely, can be displayed on a user device, etc.

As shown in FIG. 4, the controller receives a number of system inputs such as but not limited to input power status, tank status, electrolyzer and fuel cell output values, and other information such as pressures, flow rates, etc. (collectively, "system info"). Still other information can be supplied as desired, such as the status of solar panels, weather forecast information, etc. The controller is adaptive and can utilize outside information to help predict and adaptively configure the system. This enables the system to be autonomous to the user. For example, if the National Weather Service predicts a large snowfall (or other inclement weather) that may affect the ability of the solar panels to generate power in the coming days, additional steps may be taken to accumulate higher than normal levels of hydrogen. Other adaptive operations can be taken as required to ensure operation of the system meets the ongoing (including seasonally changing) needs of the local residential/commercial load.

In some cases, operational data sets may be collected and transmitted to a remote server network (e.g., data center, etc.) that may house a knowledge database that can be used to help reprogram, upgrade or otherwise configure the system on the fly as required. The conveyed information may be protected using suitable security protocols, such as encryption, blockchain techniques, hashes, digital signatures, certificates, etc., and may further be stored in one or more secure locations so that the data cannot be accessed by anyone but authorized agents.

Figure 5:
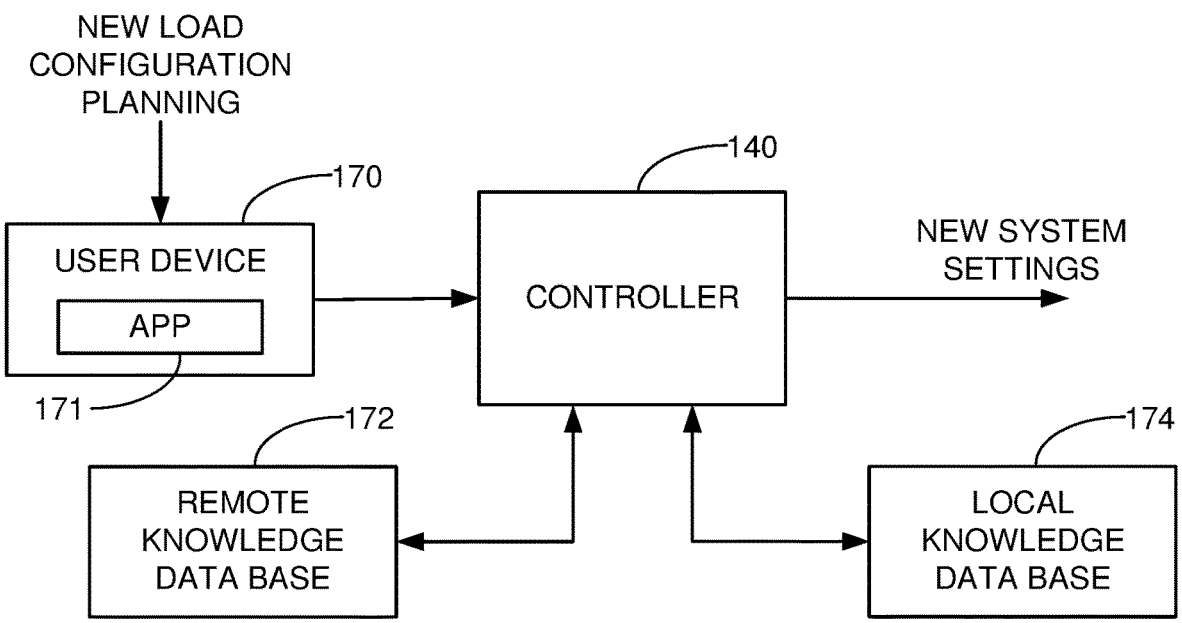
FIG. 5 shows user configuration of the controller in further embodiments.

FIG. 5 shows a further configuration of the controller 140 in communication with a user device 170. The device 170 can take any number of desired configurations including a smart phone, a tablet, a laptop computer, etc. One or more applications (apps) 171 can be stored locally and accessed by the user to manage the system. Generally, the user can input information such as new load configuration to assist the controller in planning the operational settings required to meet these needs. It will be noted that, while such user interfaces (when used) will allow user inputs to configure the system, safety protocols may be implemented such that no dangerous systems can arise; for example, flows of pressurized gas, voltages, storage of power, etc. will have built in protocols to ensure that the system is safe for the users at all times, irrespective of any inputs that may be supplied by a user input interface.

For example and not by way of limitation, the user may indicate that a new electric car has been purchased, and thus there will be a significant increase in electrical demand at night on a going forward basis while the car is being recharged. The controller can take the necessary steps to either accumulate sufficient charged hydrogen to meet this need, or make other arrangements such as activating the transfer switch to allow the lower power grid to supply the necessary additional power to meet this new load requirement.

In some cases, the app(s) 171 can be user apps, in which information is displayed concerning system operation, queries can be input to obtain system information and performance, etc. In other cases the app(s) 171 can be system administration level apps that allow system requirement, configuration, upgrade and other changes to the system. In this way, adequate safeguards can be implemented to ensure that only authorized personnel make changes to the system.

A remote knowledge data base is represented at 172 and can be used to further assist in the configuration of the system. In related embodiments, the system may itself detect changes in load requirements and make the necessary changes to energy storage and generation independently of user inputs. System interfaces may be supplied to allow those who monitor the system remotely to diagnose and effect useful changes to best meet current and future needs. The remote knowledge data base 172 may be arranged to store, analyze and track system information at a remote location (e.g., remote server, cloud computing environment, etc.). A local knowledge data base 174 can additionally or alternatively be used to provide local accumulation and analysis of system parameters and other data, enabling localized control (including system adjustments) without the need for a communication link across a network to a remote server, etc.

Figure 6:
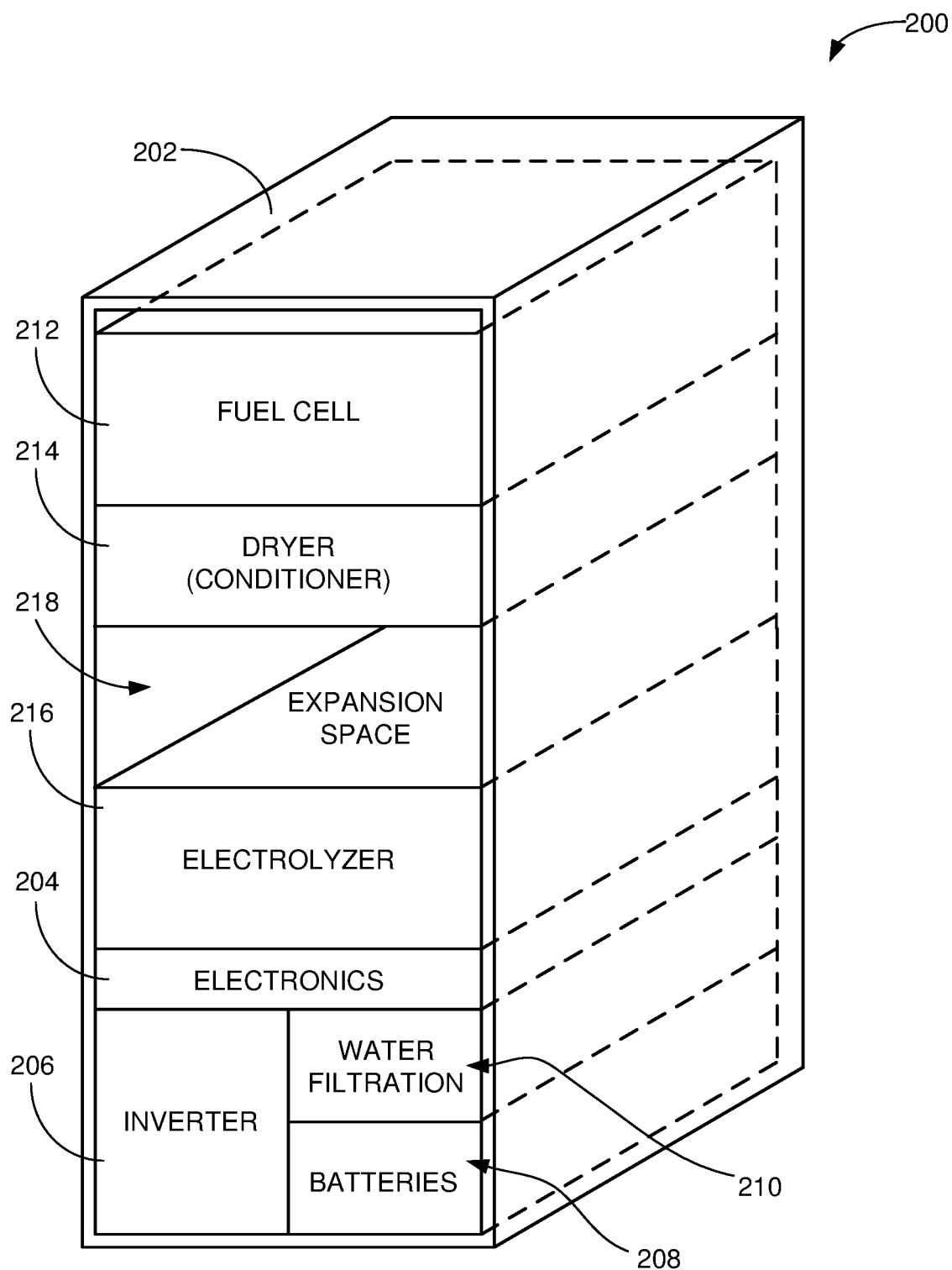
FIG. 6 shows an alternative local power generation system that can be incorporated into the system of FIG. 1 in further embodiments.

FIG. 6 shows another local power system 200 similar to the system 102 described above. Other configurations and arrangements can be used. As before, the system 200 is arranged in a rack 202 which may be sized similarly to the rack 150 discussed above. Various components include control electronics 204 (including one or more controllers), an inverter 206, local batteries 208, a water filtration system 210, a fuel cell 212, a dryer (conditioner) 214 and an electrolyzer 216. Space 218 may be provided to accommodate additional components (e.g., a second fuel cell, a second electrolyzer, etc.). Other elements may be incorporated but are not shown in the drawings for ease of illustration.

While not limiting, the system 200 may be capable of generating/outputting an energy level on the order of about 4 kilowatts (kW). Other levels can be used, including levels higher or lower than this level. Example other levels can include nominally 1 kW, 2.5 kW, 8 kW, 15 kW, etc. One currently suitable source for the inverter is Victron Energy B.V., The Netherlands. A currently suitable source for the fuel cell is Intelligent Energy Inc., Cupertino, Calif., USA. A currently suitable source for the dryer and the electrolyzer is Enapter SRL, Crespina Lorenzana, Italy. The control electronics can incorporate one or more programmable processors, local memory (including SSDs, HDDs, etc.), controller elements, communication circuitry, etc. Other sources and configurations of components can be used as desired, so these are merely illustrative and are not required.

Various plumbing and electrical interconnections (not separately shown) are established between and among these various components, such as adjacent the rear of the cabinet. The components cooperate as generally described above to generate a supply of hydrogen gas, which is stored in a remote location.

FIG. 7 schematically depicts one embodiment of a remote hydrogen gas storage system 220 having an external rack 222 that is arranged to mechanically support and protect one or more hydrogen gas tanks 224. Suitable valving, manifolds, pressure gauges, pressure relief valves, etc. are incorporated into the system, but such have been omitted for clarity of illustration. Similarly, while the rack 222 is depicted as an open rack in order to illustrate the tanks 224, it will be understood that the rack can form a portion of an enclosed, weatherproof structure. Such enclosed, weatherproof structures can also be used in situations where it is desirable to locate the system rack 202 (see FIG. 6) outdoors or in an otherwise harsh environment. Each of these types of structures can be cosmetically covered with plastic, wood, metal, shingles, etc. to resemble a typical storage shed, storage cabinet, or the like.

A pressurized supply line 226 extends from the system 200 in FIG. 6 to interconnect with the tanks 224 to transfer hydrogen to the rack 220. A manifold 228 can be used with appropriate valving, etc. (not separately shown) to provide the hydrogen to and from the respective tanks 224. A downstream transfer path 229 can extend to a secondary storage location/arrangement. While a total of four (4) tanks 224 are shown, other suitable numbers/sizes of tanks can be used, including a single tank, less than four, more than four, etc. Tanks can further be provided in multiple storage locations, etc. Locating the tanks away from the system 200 provides a number of advantages including safety, ease of maintenance, etc.

FIGS. 8A and 8B show alternative underground storage solutions for the remote storage of the hydrogen gas. FIG. 8A shows a system 230 formed by a vertical casing 232, that extends vertically from ground level 234 into subsurface strata 236. The vertical casing can extend to substantially any depth and may comprise a cylindrical pipe or other structure inserted into a vertically extending hole. The pipe is sealed at each end and configured as before to accommodate a large volume of compressed hydrogen gas. FIG. 8B shows a system 240 with a horizontally extending tank 242 that has been buried in the subsurface strata 236. Other storage configurations can be used so the foregoing examples from FIGS. 7 and 8A-8B are merely illustrative and are not limiting.

Figure 9:
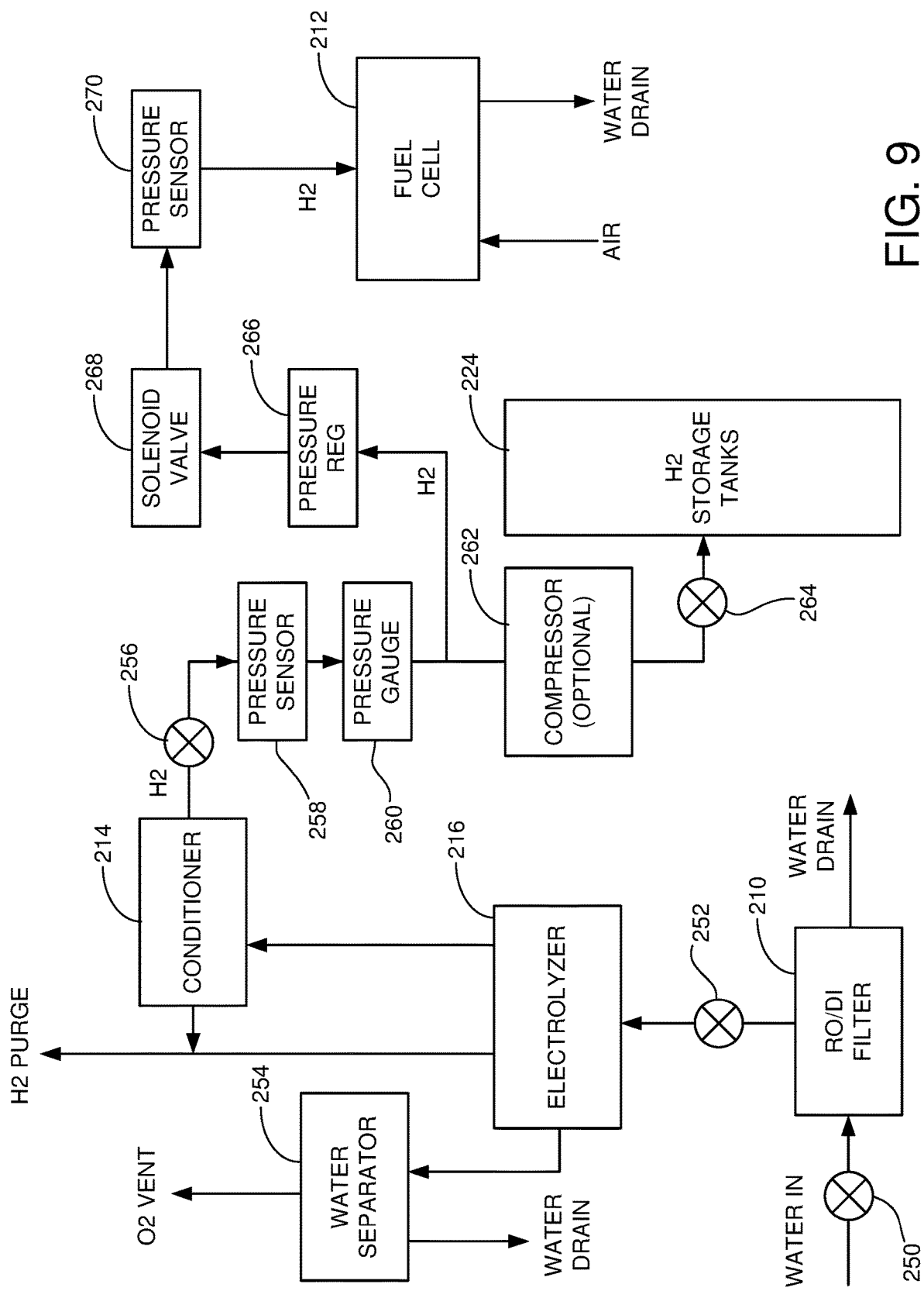
FIG. 9 is a fluidic flow diagram to illustrate operation of the system 200 in some embodiments.

FIG. 9 is a generalized flow diagram to illustrate further aspects of the system 200 of FIG. 6 in some embodiments. Additional elements may be incorporated into the system as desired, but such are unnecessary for a clear understanding of the operation of the system.

Beginning in the lower left-hand corner of FIG. 9, water is inlet from a source (not separately shown) through a control valve 250 to the filter 210, which may include a reverse osmosis (RO) or distilled (DI) process. Excess water may exit via a drain as shown. A stream of filtered water is directed through valve 252 to the electrolyzer 216, which operates as discussed above to separate the water into constituent O2 and H2 gas streams. The O2 is processed via a water separator 254 which returns water to the water drain and vents O2 gas to the surrounding atmosphere. The H2 is supplied to the conditioner 214 which operates as described above to generate a flow of dried, conditioned hydrogen gas. While not limiting, in some examples a system configured as depicted in FIG. 9 was found to provide an initial flow of hydrogen gas from the electrolyzer at a rate of about 99.5% H2 by weight. After being processed by the conditioner, the stream was increased to a rate of about 99.999% H2 by weight.

The H2 gas from the conditioner 214 passes through successive stages including a control valve 256, pressure sensor 258 and pressure gauge 260. While the sensor and gauge can be configured to provide human readable indications, it is contemplated that these will additionally or alternatively provide electronic indications to the control electronics 204 for automated sensing and, as necessary, activation. Similarly, while the various control valves may be configured for manual human operation, these can additionally or alternatively be electronically controlled and adjusted as required.

During a storage cycle, the hydrogen is passed to the storage tank(s) 224 through one or more additional elements, such as an optional compressor/booster 262 and an inlet/outlet control valve 264. The compressor/booster may be utilized to increase the pressure of the stored hydrogen gas. Suitable pressure values may be in the range of from about 500 pounds per square inch (psi) to 2200 psi or more. Other values and ranges can be used, including psi levels significantly higher than this range. As desired, a compressor stage can be used to generate liquified hydrogen for storage in some applications.

While not necessarily required, it is contemplated that hydrogen generation and electricity generation operations will not normally be carried out simultaneously; rather either one or the other modes will be activated at a time. This routing can be controlled such as via an intervening control valve (see e.g., solenoid-activated valve 268, which will be arranged within the system to effect this purpose such as through the use of a common manifold not separately shown). In this way, a "first" stream of hydrogen gas generated by the electrolyzer 216 can be directed to the storage tanks 224, and a subsequent, "second" stream of hydrogen gas can be output from the storage tanks for use in generating electricity.

During an electricity generation cycle, hydrogen will be routed from the storage tanks 224 to a pressure regulator 266 to reduce the hydrogen to a suitable pressure level. The hydrogen flows through the solenoid-activated valve 268 and a pressure sensor 270 to the fuel cell 212.

The fuel cell 212 operates to combine the inlet hydrogen gas with oxygen (O2) to generate electricity in the manner described above. The resulting water generated during this operation may be forwarded to the water drain as before. While it is contemplated that the O2 will be utilized from the surrounding air, it is contemplated in some cases it may be advantageous to collect and store the purged O2 from the water separator 254 for this purpose.

FIGS. 10-13 show different configurations of electrical power systems (e.g., 100, FIG. 1) that can be used incorporating the local power system 200 of FIG. 6. Additional configurations can be used as well. These diagrams largely depict electrical flow through the system. As such, various previously described components of the system have been omitted for simplicity of illustration.

Figure 10:
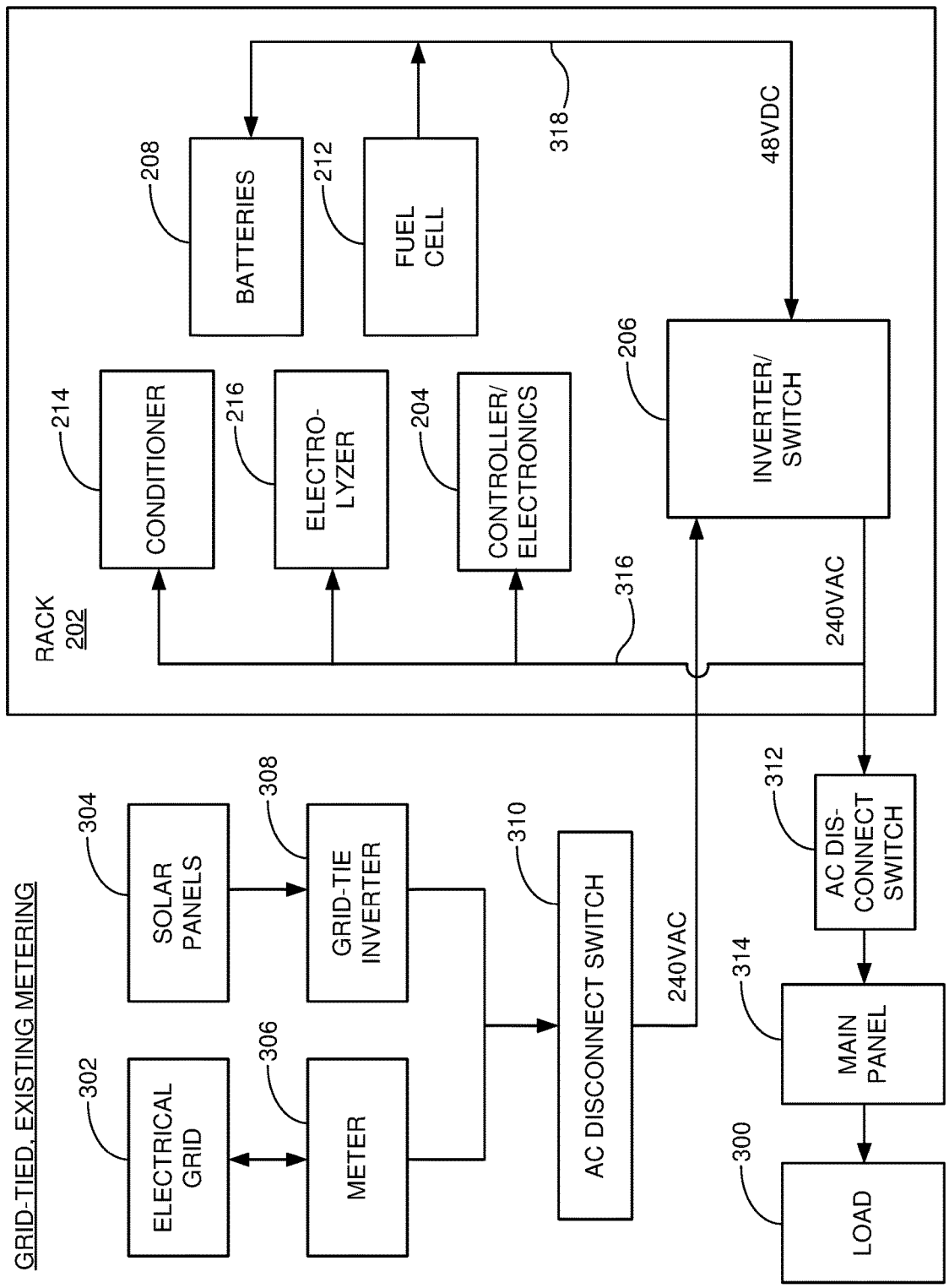
FIG. 10 is an electrical interconnection diagram for a so-called "Grid-Tied, Existing Metering" configuration for the system.

FIG. 10 shows a functional block diagram for a so-called "Grid-Tied, Existing Metering" configuration. Generally, in this configuration electricity is supplied to a load (in this case, a residential load) 300 using both an electrical power grid 302 as well as a source of local power, such as a set of solar panels 304. As noted above, other forms of local power can be utilized in this scheme including but not limited to wind power, etc. While not limiting, the arrangement in FIG. 10 is contemplated as a co-generation arrangement so that, as circumstances permit, power is primarily generated by the solar panels 304 and augmented as necessary by the electrical grid 302. The net consumption from the grid 302, as measured by an energy meter 306, is thus whatever additional power is required over and above that which is generated by the solar panels 304.

It will be appreciated that the grid 302 represents electrical power supplied from a power company source (e.g., an electric utility company, etc.). Any extra power generated by the solar panels and not used by the system can be sent to the grid for credit.

A grid-tie inverter 308 is used to tie the solar panels 304 to the grid 302 and allow nominally (in this example) 240V AC to flow through an AC disconnect switch 310 to the inverter 206. The system services the main residential load 300 by outputting 240V AC from the inverter 206 through a second AC disconnect switch 312 and a main panel (circuit breaker service) 314. Hydrogen is stored as described above as excess power is available.

In the event of a loss of power from the grid 302, the inverter is signaled and the system changes the system configuration to compensate for the lost grid power. In some embodiments, the system uses the available power from the solar panels. Any excess power beyond the needs of the load can be used to generate additional hydrogen. If the power needs are insufficient from the solar panels, the system can utilize the previously stored hydrogen (in whole or in part with what power is available from the solar panels). This system is advantageous in situations where a net metering system is already in place (e.g., elements 302-308), so that the system can be upgraded substantially by installing the local power system 200 (FIG. 6) upstream of the main panel 314.

The 240V AC output from the inverter 206 is directed (via a 240V AC bus 316) to some elements of the system rack 202, including the conditioner 214, the electrolyzer 216 and the control electronics 204. A separate transformer/power supply (not separately depicted) can be utilized to generate the necessary low voltages (e.g., 3 VDC, 5 VDC, 12 VDC, etc.) used by the control electronics.

A separate DC bus 318 is further interconnected in the system to supply a suitable direct current voltage, such as 48 VDC as shown. This 48 VDC bus 318 interconnects the inverter 206, batteries 208 and the fuel cell 212. The batteries 208 are contemplated as being rechargeable, and provide the necessary power to keep the fuel cell ready to be utilized.

Figure 11:
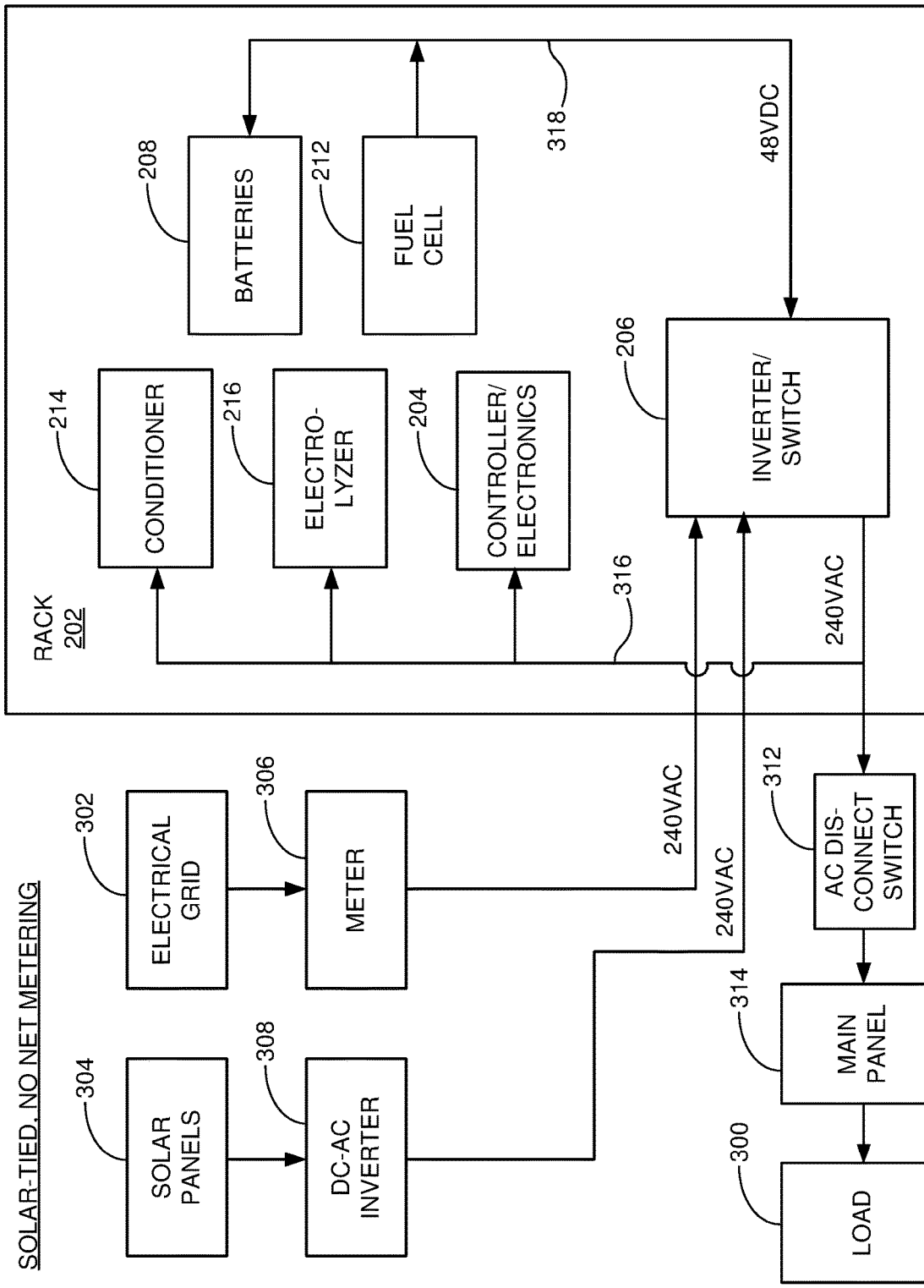
FIG. 11 is an electrical interconnection diagram for a so-called "Solar-Tied, No Net Metering" configuration for the system.

FIG. 11 shows a functional block diagram for a so-called "Solar-Tied, No Net Metering" configuration. Generally, this configuration is similar to that of FIG. 10, including on the basis that FIG. 11 is configured to receive input power from both the electrical grid 302 and from a set of solar panels 304 (or other renewable energy source). However, this system does not tie the grid and the solar panels together. Instead, the system primarily uses the power from the solar panels, and uses the grid only as needed. The system chooses the best power source (e.g., grid, solar or stored hydrogen) based upon various efficiency rules established by the knowledge base. In most cases, the system will primarily use solar power, will switch in H2 when solar is unavailable, and use grid power as a last resort. Other operational configurations can be used as desired.

Figure 12:
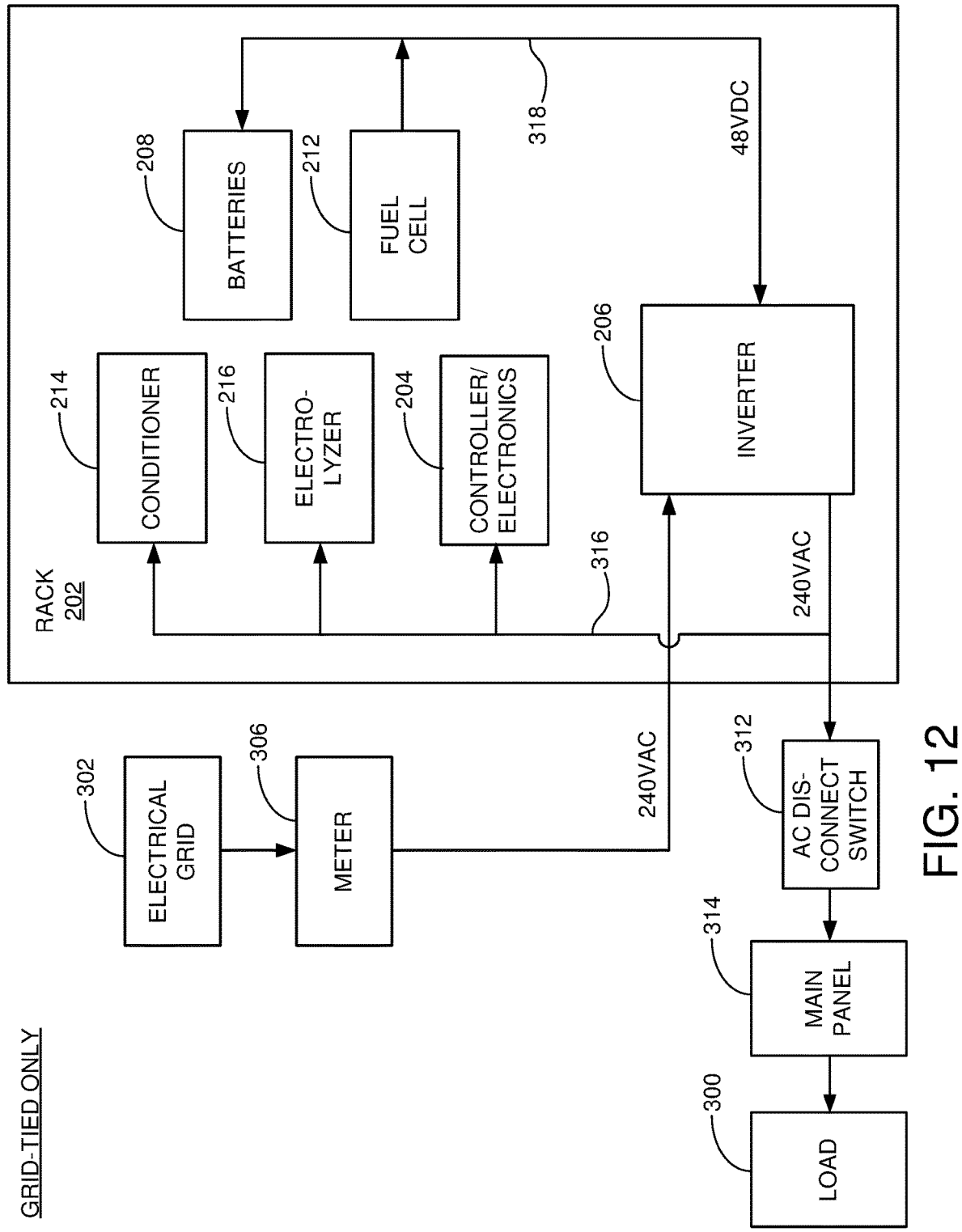
FIG. 12 is an electrical interconnection diagram for a so-called "Grid-Tied Only" configuration for the system.

FIG. 12 shows a functional block diagram for a so-called "Grid-Tied Only" configuration. This configuration does not utilize local renewable power such as the solar panels discussed above. Instead, connection is made to the electrical grid 302 which is the normal source of input power to the system. This system (as well as the other systems described herein) can enable the user to take advantage of shifts in power rates at different times of a typical 24 hour cycle. At times when power rates are lower, such as overnight, electricity can be utilized from the grid to power the (usually reduced) residential loads 300 as well as to generate stored hydrogen gas. At times when power rates are higher, such as in the afternoon, power can instead by supplied by the previously stored hydrogen gas. As before, in the event of a grid power failure, emergency backup power can continue to be supplied to the load using the stored hydrogen gas.

Figure 13:
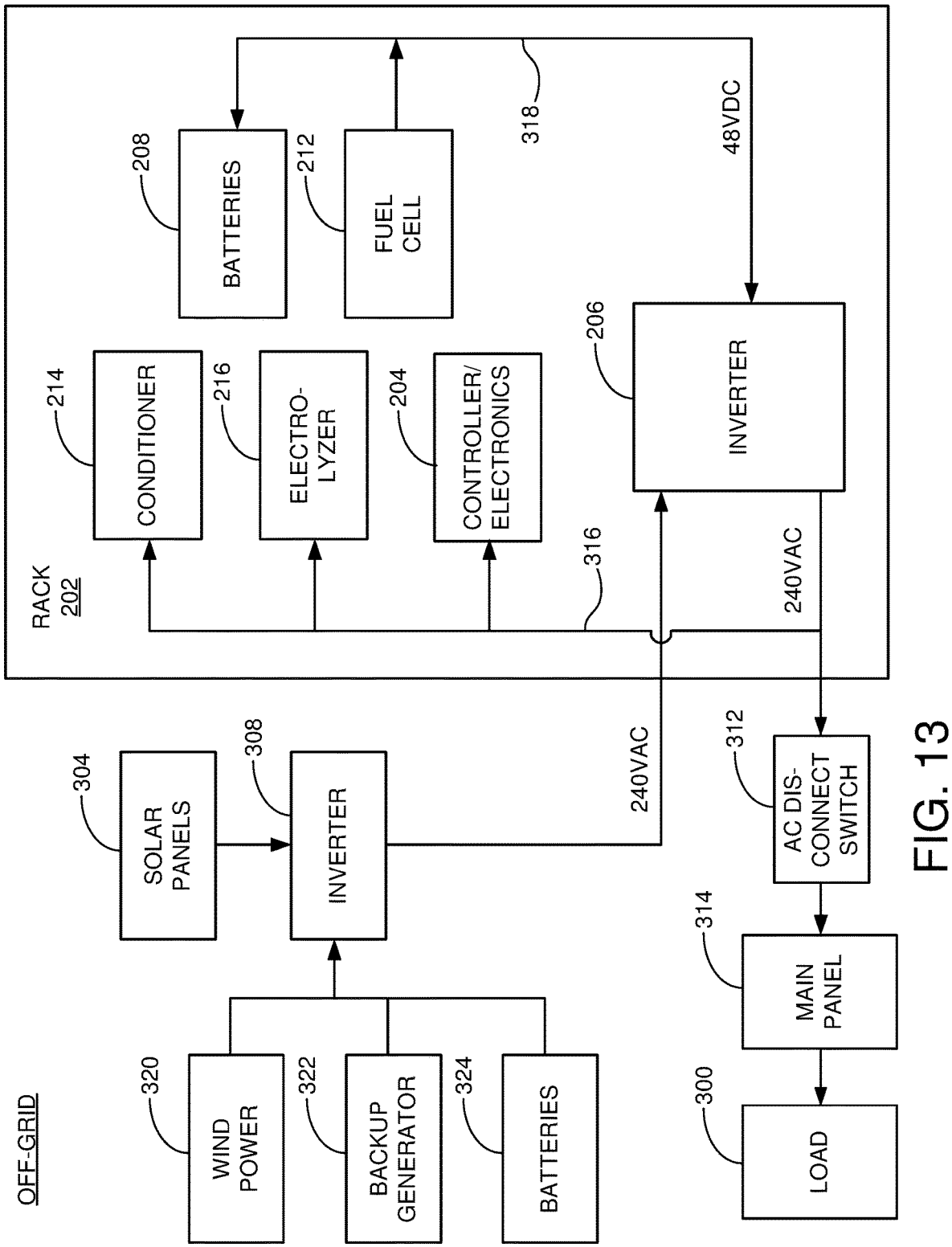
FIG. 13 is an electrical interconnection diagram for a so-called "Off-Grid" configuration for the system.

FIG. 13 shows a functional block diagram for a so-called "Off-Grid" configuration. This is similar to FIG. 11 except that there is no grid connection at all. Instead, power is supplied from one, and preferably multiple, sources of renewable or backup power, such as solar panels 304, wind power generator 320, emergency backup generator 322, batteries 324, etc. As noted previously, the wind power generator 320 may incorporate a windmill turbine with electrical generation capabilities to generate power from wind energy; the emergency backup generator may incorporate an internal combustion engine to drive an electrical generator; the batteries may store energy in a chemical form, and so on. These secondary backup systems can generate AC or DC power. If AC power is generated, the power may be routed directly to the inverter/switch 206; if DC power is generated, the power may be first routed through the AC-DC inverter 308.

The off-grid system of FIG. 13 is useful for remote locations where grid power tie-ins are inaccessible, undesired and/or unavailable. While not shown in FIG. 13, an off-grid system can further be configured to direct a portion of the stored hydrogen gas to various appliances (e.g., compressors, furnaces, cooktops, water heaters, etc.). This would allow a home or small commercial enterprise to have complete energy independence.

Figure 14:
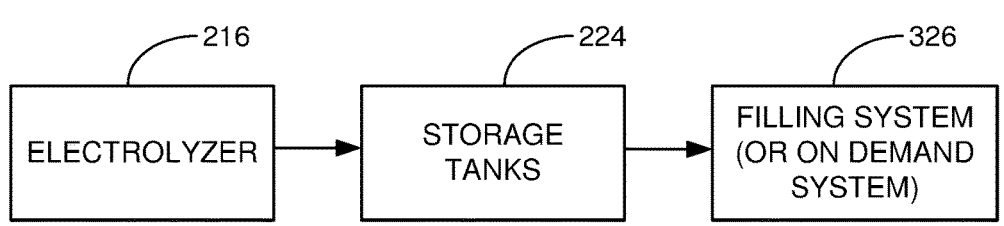
FIG. 14 shows the system in accordance with a "Hydrogen Production" configuration.

While the system as variously embodied thus far has been configured to generate electrical power from the stored hydrogen gas, other embodiments are contemplated. FIG. 14 shows aspects of another system 200A. The system 200A is similar to the system 200 described above, except that the system 200A is primarily configured to generate and dispense hydrogen gas, such as to a hydrogen powered vehicle (e.g., an automobile, a truck, a forklift, etc.). Alternatively, the system 200A can be configured for on-demand usage situations such as a furnace, a refinery, or other processing needs that require a stream of hydrogen gas.

To this end, the electrolyzer 216 generally operates as described previously to generate a conditioned flow of hydrogen gas, which is temporarily stored in the storage tanks 224. A filling system 326 is additionally provided which receives the stored hydrogen gas and dispenses the same into the desired target receptacle. The system 200A can be dedicated to the production and dispensing of the stored hydrogen, and/or can additionally incorporate the necessary components (e.g., fuel cell, etc.) to also generate electrical power as needed, to output a stream of hydrogen for local needs (appliances, etc.). FIG. 14 thus provides another example of an energy-independent capable configuration.

Figure 15:
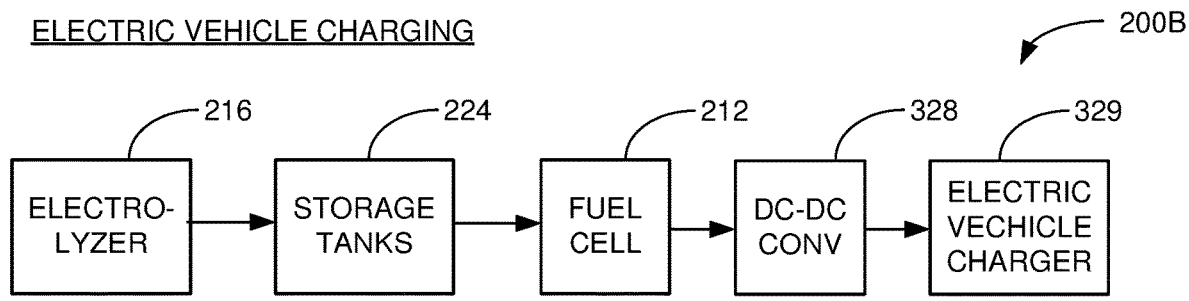
FIG. 15 illustrates another embodiment in which the system provides an "Electric Vehicle Charging" configuration.

FIG. 15 shows another alternative system 200B similar to those systems described above. The system 200B has a further capability of charging a battery-based electric vehicle (e.g., an electric automobile or truck, a forklift, etc.) that uses one or more large capacity batteries. As will be recognized, it is common to charge the batteries at times when the vehicle is not in use, such as overnight. Of course, the system 200B can be adapted for other uses, such as charging batteries for other purposes.

As before, the electrolyzer 216 cooperates with the other elements of the system to store hydrogen in the tank(s) 224. The hydrogen is subsequently directed to the fuel cell 212 to generate (in most cases) DC power at a first DC voltage level (such as nominally 48 VDC as described above).

In situations where a different DC voltage level is required for the charging operation, a DC-DC converter 328 can be used to step up or step down the DC voltage to a second level. An electric vehicle charger 329 (or similar) establishes the necessary interconnection to charge the batteries of the electric vehicle (or other battery based application) using the second DC voltage level. As before, the system can be dedicated as a battery charging system, or can be further configured to additionally supply AC or DC power for other loads as set forth above.

Figure 16:
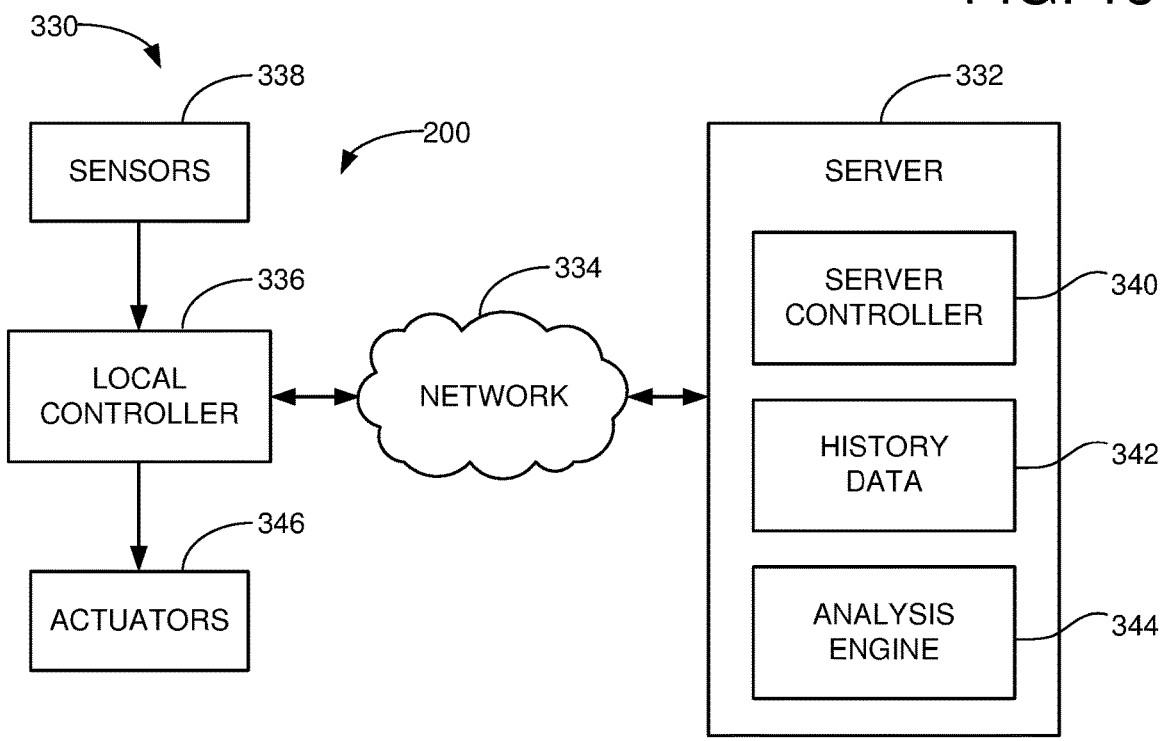
FIG. 16 depicts a data communication and processing system in accordance with some embodiments.

FIG. 16 shows a functional block representation of a data communication and processing system 330 in accordance with further embodiments. In FIG. 16, the system 200 is connected to a server 332 using a suitable network 334. The server 332 can be a remote server geographically distant from the system 200, such as in a data center or other cloud based environment. The server 332 can additionally or alternatively be located locally. Hence, the network 334 can comprise a local area network, a wide area network, a wireless network, the Internet, etc. or any combination of these or other configurations.

As described previously, the system can operate using a knowledge base that monitors, tracks and optimizes the operation of the hydrogen generation, storage and utilization processes. The local system 200 thus includes a local controller 336 (similar to the controller described above) that receives various parametric inputs from various sensors (collectively denoted at 338). In some embodiments, these and other values may be communicated to the server 332 via the network 334.

The server 332 may include a server controller 340, which processes the data received from the system 200. This can include storage of the system data in a history database structure 342 in server memory, and analysis of the data using an analysis engine 344. As before, both of the controllers 336, 340 may be realized using one or more programmable processors that execute program instructions stored in an associated memory, but can also or alternatively incorporate other forms of processing such as hardware circuits, ASICs, industrial controllers, etc. in order to carry out the requisite functions.

In some cases, the analysis engine can be used to direct information back to the local controller 336 for various actions, collectively referred to as actuators 346 (e.g., activation of switches, valves, transfer operations, etc.). The analysis engine can additionally or alternately provide feedback to a user device of the system 200. In this way, improved performance can be obtained over time, including anonymous information based on information gleaned from other users of similar systems. As before, it is contemplated the local controller 336 can also have the requisite functionality to automate and optimize the operation of the system apart from the operation of the server 332. Constant network connectivity is not required.

Remote and local knowledge data bases (see e.g., 172, 174 in FIG. 5) can be separately used as needed. Alternatives include no remote connection being required, so that the local knowledge data base is sufficient; periodic interconnections can be carried out at suitable times to transfer data from the remote knowledge data base to augment the local knowledge data base; and so on.

In some cases, the knowledge data base(s) can allow analysis trends to be established based on actual performance (both power generation and power utilization) to best configure the system, including but not limited to when to switch between multiple available power sources, when to switch to the generation of hydrogen gas, when to switch to the use of the hydrogen gas to generate power, how much hydrogen gas to have on-hand to meet anticipated needs, how much reserve secondary power to maintain (e.g., fuel for electrical generators, storage levels of backup batteries, etc.) based on expected changes to the system (e.g., a forecast blizzard or other storm, etc), and so on. Smart house capabilities can be incorporated into or interfaced with the controller to make decisions on which loads to use and which loads to disengage to manage an existing power budget.

In one example, if anticipated grid failures are contemplated based on seasonal reasons (e.g., hurricane season, fire season, etc.), changes to a baseline level of operation can be enacted. A first profile can be established for operation of the system under normal conditions, and a second profile can be established for operation of the system under abnormal conditions. Over time, trends can be accumulated throughout the year so the profiles can be adjusted on a seasonal (e.g., winter, summer, spring, fall) basis, on a monthly basis throughout the year, on a weekly basis, on a daily basis, etc.

As noted above, external information can additionally be implemented into the system. Weather forecast information, such as forecast high and low temperatures (both daily and multi-day outlooks) can be utilized to estimate load, storage and generation levels and schedules. Other types of information can be similarly used. Neural networks, AI, machine learning systems, etc. can be incorporated locally or remotely to provide the requisite control as desired.

Figure 17:
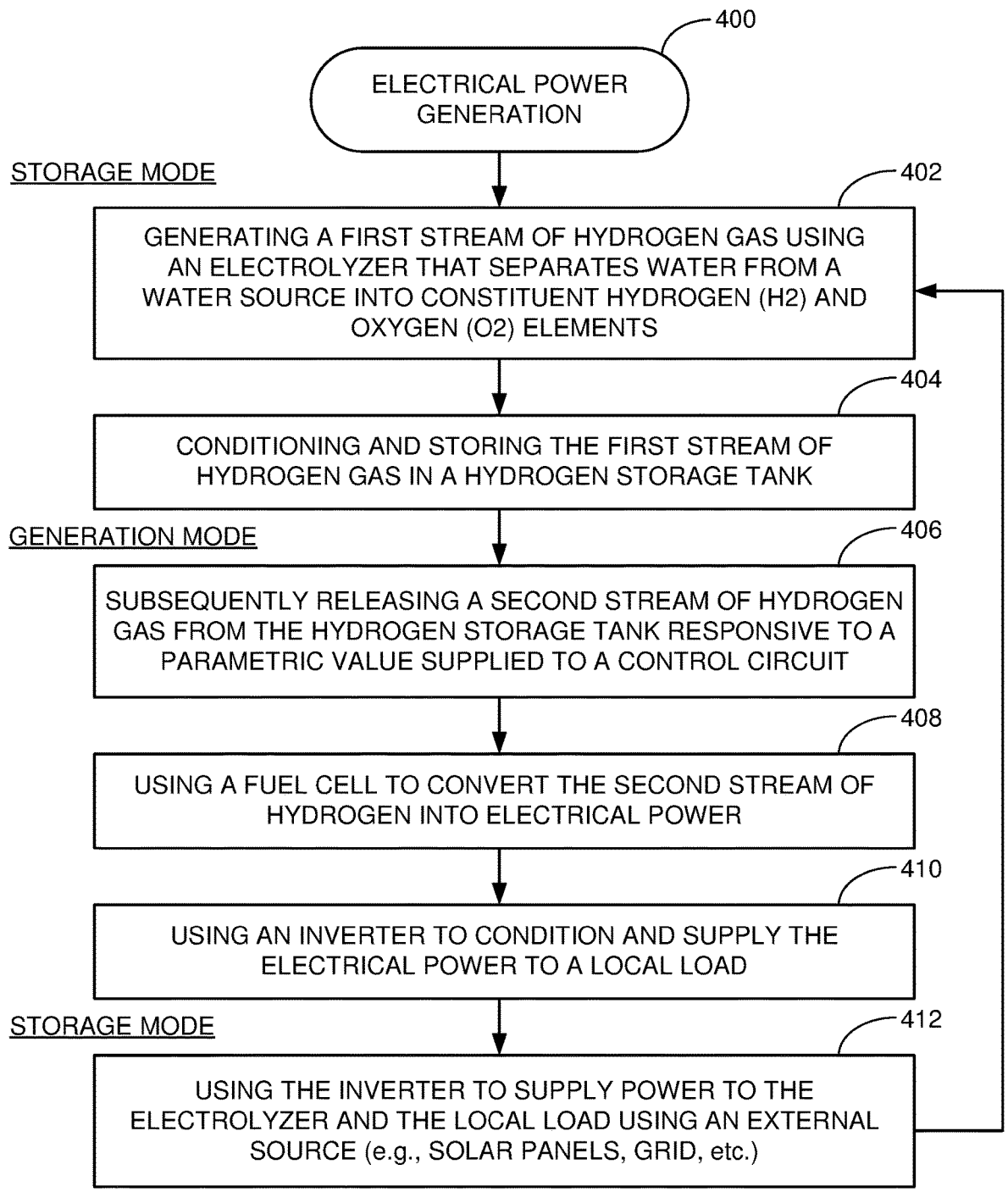
FIG. 17 is a flow chart for a power generation routine illustrative of various steps that can be taken by some embodiments of the present disclosure.

FIG. 17 provides a flow chart for an electrical power generation routine 400 to summarize the foregoing discussion. It will be appreciated that the flow chart is generalized in nature and various alternative and additional steps can be used to modify, augment, append or otherwise the process flow.

As shown at step 402, a first stream of hydrogen gas is generated using an electrolyzer that operates upon water from a water source to separate the water into constituent elements of hydrogen ($H_2$) and oxygen ($O_2$). The first stream of hydrogen gas is conditioned and stored, at step 404, in one or more hydrogen storage tanks. These steps are sometimes herein referred to as a storage mode, and the process can be powered using any number of the alternative configurations discussed above.

At such time that it is desired to transition from the storage mode to a generation mode, a second stream of hydrogen gas is released from the hydrogen storage tank(s), step 406. This transition from the storage mode to the generation mode is carried out by the controller circuit (e.g., controller 336) in response to at least one parametric value (e.g., sensor signal).

As discussed above, this parametric value can include any number of different types of factors, or combination thereof, including but not limited to: detection of a grid failure, detection of the time of day (e.g., evening so no solar will be available for the next several hours), a change in time at which it is more advantageous to commence generation of electrical power, a sensing of a storage level of the tank(s), an indication regarding future opportunities to generate power locally using a renewable source (e.g., a weather report, etc.), an anticipated change in future loading (either reduced or greater load), or any other value generated by or supplied to the system indicative that a change would be advantageous. It will be appreciated that the aforementioned knowledge base can be utilized to select appropriate times to switch over, and that these inputs can be supplied locally or via a remote server as required.

A fuel cell (or multiple fuel cells) is/are utilized at step 408 to convert the second stream of hydrogen gas from the storage tank(s) to electrical power. As discussed above, it is contemplated that this output power will be in the form of direct current (DC) power at a suitable voltage level, such as but not limited to nominally 48 VDC. Other suitable values include, but are not limited to 12 VDC, 24 VDC, 96 VDC, etc. Also, as noted above the output from the fuel cell may instead be in the form of AC power.

An inverter is thereafter used at step 410 to invert and otherwise condition the power to supply such to a local load (e.g., at least one local electrical load associated with a residential or commercial structure, etc.). This may include outputting standard single phase 240V AC, although other levels and forms can be used, including different frequencies, voltage magnitudes, numbers of phases, etc. Other configurations can be used, however; for example, in some cases it may be desirable to supply DC power from the inverter to the load, etc. The inverter may include transfer switching capabilities to switch among various inputs and outputs.

Finally, because at least some embodiments are configured to alternate between the storage and generation modes, step 412 shows a transition back to the storage mode, in which the inverter is directed to supply power to the electrolyzer (step 402) as well as to the local load using an external power source. As discussed above, a variety of configurations are contemplated such as solar panels, an electrical grid, etc.

The transitioning between the storage mode and the generation mode are carried out by the control circuit (e.g., controller 336, etc.). An actuator (e.g., 346) such as control valve 268 may be activated by the control circuit to redirect the flow of hydrogen gas. Other actuators may include power switches that are activated to engage/disengage powering of the respective electrolyzer and fuel cell, the transition of power paths from various internal and external power sources, etc. The activation takes place based on one or more sensor signals from one or more sensors, as discussed above. Any number of suitable communication protocols can be implemented to allow communication among these various components including, but not limited to, CAN-BUS (controller area network protocol), MOD-BUS, RS232, Ethernet, wireless interconnections, etc.

It will now be appreciated that the various embodiments presented herein provide a sustainable energy solution with a number of benefits over the existing art. The use of hydrogen storage is cleaner, more efficient and safer, both for the user and the environment. The system is modular so that, as required, additional tanks, hydrolyzers, and/or fuel cells can be integrated into the system seamlessly to provide additional power generating capabilities. The system can be coupled to an existing power-grid from a power company, to a local source of renewable energy (e.g., solar, wind, hydro), to an existing bank of storage batteries, etc.

While not necessarily limiting, the system can be configured to be fully self-sustaining, requiring true local, off-the-grid efficient power generation. The system can be sized and configured to accommodate any number of different applications. Environmentally extreme and isolated conditions (e.g., Arctic or tropical locations, desert conditions, ocean-going or ocean based vessels and platforms, etc.) can be readily accommodated. Water for the system can be provided from any suitable source including but not limited to a domestic supply (e.g., a municipal water company), a well, a storage tank, a rain water collection system, a water vapor extractor, a desalination mechanism, etc. Power generated by the system can be used to run these and other support systems. In many cases, provided there is sufficient hydrogen and stored power in the batteries to initiate the fuel cell(s), energy can be generated for use by the system even in the absence of any other local source of power.

Any number of different design configurations are contemplated by the present disclosure. These include, but are not limited to, the following:

1. A completely green energy system that is self-sustaining and not connected to an existing energy grid, and which generates substantially zero carbon emissions. This can include systems where the only source of power is through the fuel cell, or systems that have secondary powered backup systems such as through the use of an emergency backup generator, batteries, etc.
2. A grey/green system where a tie-in is provided to an existing energy grid, but the primary energy of the local load is supplied by the system and the energy grid is only used in exceptional conditions to power the input of the hydrogen generation cycle.
3. A grey/green system where the system is utilized as a peak usage system to supply power either at times of peak power cost (e.g., in the afternoons) or as a power back-up system so that power can be supplied automatically should a power disruption event take place.
4. A system where the output of the electrolyzer operates to generate compressed hydrogen gas, for the use by automobiles or other loads such as fork lifts, hospitals, airships, refineries, furnaces, etc.
5. Any combination of the above where the system provides compressed hydrogen for an automobile (or other load) while also supplying a portion of the hydrogen to generate electricity for local loads.
6. Any combination of the above, wherein the system further is configured to supply pressurized hydrogen for various utilities, such as but not included to an HVAC furnace, a water heater, a cooktop stove, etc. in a "smart home" environment.

Other configurations will readily occur to the skilled artisan in view of the present disclosure.

In sum, a control system operates, including in cooperation with a knowledge base, to combine individual components and control them autonomously. The design is modular and simple to install. Monitoring is performed via system and reporting of functional issues, needed repairs or system efficiencies will be carried out to require the least amount of human interface during operation. In some cases, voice activated smart home systems may be accessed by the user to inquire how much equivalent power is stored, how long can the system operate on backup power, etc.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:
1. An electrical power generation system comprising:
an electrolyzer configured to generate a stream of hydrogen gas from water supplied by a water source and using power from an input power source;
a hydrogen tank configured to temporarily store the stream of hydrogen;
a fuel cell configured to convert the stream of hydrogen into an output direct current (DC) power;
an inverter configured to convert the output DC power to an output alternating current (AC) power for use by a local load; and
a controller circuit configured to, autonomously and without user input, adaptively change a rate at which the output AC power is output by the inverter responsive to at least one system parameter by accumulating, as a data structure in a local memory, a local data set associated with the operation of the electrical power generation system into a local knowledge base, by transferring the local data set from the local memory across a network to a remote server which maintains a remote knowledge base comprising a set of remote information associated with the electrical power generation system with the set of remote information including the local data set plus a set of additional information from at least one independent source not associated with the electrical power generation system, by receiving, from the remote server across the network, control inputs based on the local data set from the electrical power generation system and based on the set of additional information from the at least one independent source not associated with the electrical power generation system, and by switching between a storage mode in which the hydrogen gas is generated and stored in the storage tank and a power generation mode in which the hydrogen gas is passed from the storage tank to the fuel cell to generate electricity responsive to the control inputs, the control inputs generated autonomously by the remote server independently of any inputs from a user, wherein the local data set comprises at least one sensor output from a sensor of the power generation system, wherein the controller circuit is further configured to activate an actuator of the power generation system to switch between the storage mode and the power generation mode responsive to the control inputs from the remote server, and wherein the controller circuit is further configured to alternatively activate the actuator of the power generation system to switch between the storage mode and the power generation mode responsive to automated detection of a new load added to the system.

2. The system of claim 1, further comprising a conditioner that conditions the stream of hydrogen gas generated by the electrolyzer by removing a water content therein prior to storage in the hydrogen tank.

3. The system of claim 1, further comprising a water filtration mechanism to filter the water supplied by the water source prior to use by the electrolyzer, and a water filtration sensor to monitor operation of the water filtration mechanism over time to ensure operation within specified parameters.

4. The system of claim 1, further comprising a water separator coupled to an output of the electrolyzer to return a stream of water back to the water source and to output a stream of oxygen (02).

5. The system of claim 1, further comprising a compressor which increases a pressure of the stream of hydrogen gas generated by the electrolyzer prior to storage in the hydrogen tank.

6. The system of claim 1, further comprising a pressure sensor configured to provide, to the controller circuit, an indication signal indicating a pressure of the stream of hydrogen gas.

7. The system of claim 1, wherein the stream of hydrogen generated by the electrolyzer and stored in the hydrogen tank is subsequently released from the hydrogen tank as a second stream of hydrogen for direction to the fuel cell which converts the second stream of hydrogen into the output DC power.

8. The system of claim 1, wherein the controller circuit comprises a programmable processor which executes associated program instructions stored in a processor memory.

9. The system of claim 1, wherein the inverter receives input AC power from at least one of an external electrical grid from a power company source or a local renewable energy source and directs a portion of the input AC power to power the electrolyzer.

10. The system of claim 9, wherein the local renewable energy source comprises at least a selected one of a set of solar panels, a wind turbine or a hydroelectric generation unit.

11. The system of claim 1, arranged in an off-grid configuration such that no electrical connection exists between the power generation system and an external electrical grid from a power company source.

12. The system of claim 1, further comprising at least one battery configured to supply DC power to the fuel cell.

13. The system of claim 1, wherein the set of additional information from the at least one independent source comprises a weather forecast of upcoming weather conditions for a location at which the electrical power generation system is disposed, the weather forecast generated by a governmental weather monitoring source and supplied as an input to a neural network, artificial intelligence (AI) or machine learning system which autonomously generates the control inputs responsive thereto.

14. The system of claim 1, wherein the controller circuit is further configured to operate in accordance with a first profile in accordance with a different, second operational profile under an abnormal set of conditions, the controller circuit transitioning from the first operational profile to the second operational profile responsive to at least a selected one of the local knowledge base stored in the local memory or the remote knowledge base stored at the remote server without an interruption of AC output power from the inverter and independently of a user command to switch between the first and second operational profiles.

15. The system of claim 1, further comprising an output system that directs a portion of the stored hydrogen gas from the storage tank to an on-demand load.

16. The system of claim 1, further comprising a hydrogen filling system coupled to the hydrogen tank configured to dispense a portion of the hydrogen gas stored by the hydrogen tank to a receptacle of a hydrogen powered vehicle.

17. The system of claim 7, wherein the second stream of hydrogen is directed from the hydrogen tank to the fuel cell through a gas control valve and monitored by a pressure sensor which provides a pressure sensor indication to the controller circuit for incorporation into the local knowledge base.

18. The system of claim 16, wherein the hydrogen filling system comprises a compressor configured to increase a pressure of the hydrogen gas.

* * * * *